(12) United States Patent
Koyama et al.

(10) Patent No.: US 6,234,800 B1
(45) Date of Patent: May 22, 2001

(54) SIMULATOR

(75) Inventors: Junichiro Koyama, Yokohama; Shinichiro Aiki, Kawasaki, both of (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/337,487

(22) Filed: Jun. 21, 1999

(30) Foreign Application Priority Data

Jun. 26, 1998 (JP) .................................................. 10-196690
Nov. 20, 1998 (JP) .................................................. 10-347909

(51) Int. Cl.[7] .................................................. G09B 9/04
(52) U.S. Cl. .................................................. 434/61
(58) Field of Search .................................. 434/61, 69, 29, 434/307 R, 247, 62, 308, 55, 57, 365; 463/6, 7; 273/148 B; 446/440; 180/218; 472/130; 482/1, 4, 57, 901, 902; 703/8

(56) References Cited

U.S. PATENT DOCUMENTS

| | | | |
|---|---|---|---|
| 3,686,776 | * 8/1972 | Dahl | 434/61 |
| 4,887,967 | * 12/1989 | Letovsky et al. | 434/61 |
| 5,240,417 | * 8/1993 | Smithson et al. | 434/61 |
| 5,364,271 | * 11/1994 | Aknin et al. | 434/61 |
| 5,415,550 | * 5/1995 | Aoki et al. | 434/61 |
| 5,533,899 | * 7/1996 | Young | 434/61 |
| 5,547,382 | * 8/1996 | Yamasaki et al. | 434/61 |
| 5,997,303 | * 12/1999 | Yoshida et al. | 434/61 |
| 6,030,223 | * 2/2000 | Sugimori | 434/61 |

FOREIGN PATENT DOCUMENTS

| | | | |
|---|---|---|---|
| 4207805A1 | * 9/1993 | (DE) | 434/61 |
| 1-232380 | * 9/1989 | (JP) | 434/61 |
| 9-75543 | 3/1997 | (JP) . | |

* cited by examiner

Primary Examiner—Joe H. Cheng
(74) Attorney, Agent, or Firm—Oliff & Berridge, PLC

(57) ABSTRACT

A simulator improved in operability and reality, in which a player can maintain a riding portion at a predetermined angle and return it to a neutral position, with the player's feet being apart from a base. The simulator has a base 112, a riding portion 114 located above the base 112, a rear end supporter 118 located on the base 112 to support the rear end of the riding portion 114 at a point, and a forward end supporter located on the base 112 to support the front end of the riding portion 114 so that the riding portion 114 can be rocked laterally from the neutral position about the rocking point in the rear end supporter 118.

36 Claims, 22 Drawing Sheets

SIMULATOR

BACKGROUND OF THE INVENTION

1. Field of the Invention

The present invention relates to a simulator, particularly to a simulator including a rockable riding portion.

2. Description of the Prior Art

As a simulator including a rockable riding portion on which a player or the like is to ride, there are known various game machines such as motorcycle games and so on.

One of such known simulators for playing the motorcycle games comprises a base placed on the floor, a riding portion that is modeled on a motorcycle and rockable transversely on the base portion, and a handlebar formed on the riding portion.

In such a simulator, a player rides on the riding portion with his or her feet placed on the base. The player operates a twist grip throttle and brake lever provided on the opposite ends of the handlebar. Thus, the player can control the speed of the moving motorcycle represented on a display. When the player tilts the entire riding portion leftward or rightward, he or she can control the direction of the moving motorcycle represented on the display.

However, this conventional simulator cannot provide a realistic driving feel since the player must operate the riding portion with his or her feet placed on the base.

When the player tilts the riding portion leftward or rightward, the player's head will also be tilted about the axis of the riding portion. Therefore, the player's head will largely be out of the center of the display so that it will be difficult for the player to see the display. In addition, a motion such as a simple leftward and rightward tilting of the riding portion is artificial in comparison with the real motorcycle. This also loses a feeling of driving a real motorcycle.

Furthermore, the player on the riding portion is required to exert a relatively large force when the entire riding portion is to be tilted leftward or rightward about the axis thereof.

SUMMARY OF THE INVENTION

It is therefore an object of the present invention to provide a simulator having an improved operability and reality, which can be tilted and held by a player at a predetermined inclination with the player's feet being separated away from a base and in which a riding portion can easily be returned from the tilted position to the neutral position.

Another object of the present invention is to provide a simulator which can be operated by a player with increased reality while looking the direction of advance since the player's head will not largely be out of the neutral position even if the riding portion is highly tilted by the player.

Still another object of the present invention is to provide a simulator in which a riding portion can be operated by a player with a reduced force and yet which permits the player to act with more reality.

To this end, according to a first aspect of the present invention, there is provided a simulator comprising: a base; a riding portion located above the base; a rear end supporter located on the base for supporting the rear end of the riding portion at a rocking point; and a forward end supporter located on the base for supporting the front end of the riding portion for lateral rocking motion from a neutral position about the rocking point of the rear end supporter.

The riding portion of the simulator has its rear part supported by the rear end supporter and its front part supported by the forward end supporter for lateral rocking motion. Thus, a player can easily rock the front part of the riding portion laterally about the rocking point of the rear end supporter with a reduced force. Furthermore, the player may easily rock the riding portion by moving the player's weight on the riding portion with his or her feet being separated apart from the base. In addition, the player can easily return the riding portion from a rocked position to the neutral position since the entire riding portion will not laterally be displaced on rocking.

Therefore, a simulator having an improved operability can be realized.

The upper-half body of the player will largely be moved laterally by laterally moving the front part of the riding portion about the rocking point. Thus, the player can feel an increased reality.

The forward end supporter may support the riding portion in such a manner that the riding portion is tilted in a direction opposite to the direction of movement of the front end of the riding portion on rocking.

In the simulator of the present invention, the player can feel the inclination of a vehicle on cornering since the riding portion is tilted on rocking. Thus, the player can feel such a reality as he or she actually drives the vehicle.

Since the riding portion is tilted in the direction opposite to the direction of movement of the front part of the riding portion, the player's head can minimally be changed in position due to the rocking motion of the riding portion. Thus, the player's line-of-sight will not be largely moved from the viewpoint of the player riding on the riding portion in the neutral position.

In order to realize such a simulator, the forward end supporter may be formed of a four-link mechanism comprising: a pair of intermediate links connected at their lower ends to the base through two pairing elements; and a top-side link connected to the top ends of the respective intermediate links through two other pairing elements, the front end of the riding portion being connected at its forward end to the top-side link.

It can thus be realized that a simulator having an improved operability and increased reality for the player is of a simplified structure.

When the forward end supporter is of such a four-link mechanism, the distance between the two other pairing elements connecting the pair of intermediate links to the top-side link may be smaller than that between the two pairing elements connecting the pair of intermediate links to the base.

In such an arrangement, the intermediate links will not be tilted laterally at their tilted positions on rocking of the riding portion. Therefore, the player can easily return the riding portion from its tilted position to its neutral position with a reduced force.

The top-side link may include a steering portion. When the player pulls the steering portion toward himself or herself, the rocked and displaced riding portion can be returned to its neutral position. Thus, the player can surely do the returning operation of the riding portion even though the player's feet are separated apart from the base.

The steering portion may include at least one handlebar fixedly mounted on the top-side link for the player to comfortably operate the simulator.

If the two other pairing elements for connecting the pair of intermediate links to the top-side link in the forward end supporter is formed of a ball-and-socket joint, any change in the distance between the top-side link and the rear end supporter on rocking can be absorbed by such ball-and-socket joints.

The riding portion may be connected to the rear end supporter through a ball-and-socket joint structure. Thus, the riding portion held (or supported) by the rear end supporter can freely be rocked about the holding point (or rocking point). In addition, this ball-and-socket joint structure can simply accomplish the inclination of the riding portion on rocking. In such a manner, the simulator of the present invention can be of a simplified and inexpensive structure since the complicated action in the riding portion can be realized by the simple structure or ball-and-socket joint structure.

The rear end supporter may allow any fore and aft shift in the rocking point supporting the riding portion on rocking. In such an arrangement, any change in the distance between the forward end supporter and the rear end supporter due to the lateral rocking motion of the front part of the riding portion from its neutral position can smoothly be absorbed by shifting the rocking point in the rear end supporter.

Allowing the fore and aft shift in the rocking point may be accomplished by any suitable means. For example, the rear end supporter may include a movable support pivotally mounted at one end to the base about a shaft arranged substantially parallel to a plane including the rockable forward end supporter as well as the direction of rocking of the riding portion, the other end of the movable support being connected to the riding portion. In such an arrangement, the rear end supporter allowing shift in the rocking point may simply be realized.

The riding portion may comprise a front riding section connected to the top-side link and a rear riding section connected to the rear end supporter, and the front and rear riding sections may be rotatably connected to each other through a shaft substantially parallel to the rocking direction of the front end of the riding portion. In such an arrangement, any change in the distance between the top-side link and the rear end supporter on rocking can be more smoothly absorbed.

If the forward end supporter is in the form of a four-link mechanism, the simulator may further comprise:

two stopper plates each fixedly mounted on the respective one of the pair of intermediate links at its lower end, these stopper plates rocking together with the pair of intermediate links on rocking of the forward end supporter;

first stopper receiving members each interposed between each of the stopper plates and the base in the inside region between the intermediate links, each of the first stopper receiving members limiting the angle of rocking toward the inside region between the pair of intermediate links; and second stopper receiving members each interposed between the respective one of the stopper plates and the base in the outside regions of the pair of intermediate links, each of the second stopper receiving members limiting the angle of rocking toward the outside region of each of the intermediate links.

Thus, any excessive tilt in the pair of intermediate links on rocking can be avoided. Therefore, the player can easily return the riding portion from a rocked position to its neutral position. This improves the operability of the riding portion.

Particularly, when the distance between the pairing elements of the top-side link is smaller than the distance between the pairing elements of the base, the stopper plates, first stopper receiving members and second stopper receiving members may stop one of the pair of intermediate links substantially at a vertical position on the maximum rocking amount of the riding portion. In such an arrangement, on the maximum rocking amount of the riding portion, the riding portion's weight and the player's weight on the riding portion can surely be supported by one of the intermediate links substantially in its vertical position. In addition, the returning force may be very small since the player can return the riding portion to its neutral position merely by tilting the intermediate link from substantially its vertical position. This provides a simulator having an improved operability.

The simulator may further comprise a returning means for returning the riding portion from a rocked position to a neutral position. In such a case, the player can easily return the riding portion to its neutral position with a reduced force since the returning means aids the riding portion to return to its neutral position. Particularly, where the forward end supporter is in the form of a substantially trapezoid four-link mechanism and if one of the intermediate links can stop at its substantially vertical position on the maximum rocking amount, the provision of the returning means can more simplify the player's returning operation.

Such a returning means may be accomplished by any suitable means. For example, if the forward end supporter is in the form of a four-link mechanism, the two pairing elements for connecting the pair of intermediate links to the base may include rotatable shafts that intersect a plane containing the pair of intermediate links, respectively, and at least one of these rotatable shafts may be provided with the returning means. Alternatively, the returning means may be provided on both of the two rotatable shafts.

The forward end supporter may include a locking means for maintaining the riding portion at a neutral position. In such an arrangement, the locking means may prevent the riding portion from being rocked, for example, when the player is to get on the riding portion. Thus, the player can easily get on the riding portion.

The forward end supporter in the form of a four-link mechanism may include a distance control mechanism for pairing elements for controlling the distance between the two pairing elements on the lower ends of the pair of intermediate links. Such a distance control mechanism for pairing elements can change the distance between the lower pairing elements. Thus, the riding portion can be operated by the player in a manner suitable for running situation to be simulated.

On a low-speed running simulation, for example, the distance between the lower pairing elements may be widened to lower the positions of the top-side link and riding portion's forward end. Thus, the player can feel a stably running state with the player being in its lowered position. On the other hand, when it is wanted to do a high-speed running or accelerating simulation, the distance between the lower pairing elements may be reduced to raise the positions of the top-side link and riding portion's forward end. Thus, the player can feel an unstably running state with the player being in its raised position.

Particularly when the distance between the lower pairing elements is widened, the inclination in the riding portion can be increased to realize a sharply cornering state on low speed. When the distance between the lower pairing elements is reduced, the inclination in the riding portion can be decreased, so that it will be difficult to accomplish a sharply cornering state on high speed.

For example, the distance control mechanism for pairing elements may comprise a slide rail for supporting the two pairing elements on the lower ends of the pair of intermediate links for lateral sliding movement, and a drive device for moving the two pairing elements on the lower ends of the pair of intermediate links along the slide rail.

Furthermore, the forward end supporter in the form of a four-link mechanism may include a link-length changing mechanism for changing the length of each of the pair of intermediate links.

In such an arrangement, the motion of the riding portion for low speed may easily be realized by the link-length changing mechanism.

The simulator may further comprise a display means that represents a simulated image for a game and is located in front of the riding portion.

Thus, the player can operate the riding portion while looking the simulated image of the game represented on the display means. This can permit the player to enjoy the game with an improved reality.

The display means may be located on an extension of line-of-sight of the player on the riding portion in its neutral position. Thus, the player on the riding portion can easily look the display means even though the riding portion is tilted leftward or rightward from its neutral position.

If the simulator of the present invention is applied to a motorcycle simulator, the riding portion may be modeled on the shape of a motorcycle, and the display means may represent a simulated image of a motorcycle game for a player riding on the riding portion.

In such an arrangement, the player can enjoy the motorcycle game while visually feeling such a feel as the player actually drives the motorcycle.

If the riding portion is modeled on the motorcycle, the riding portion may have a seat section on the rear part of the riding portion, and steps on the sides of the riding portion below the seat section.

Where the riding portion has the seat section on the top of the rear end, the player's weight will be located on the rear end supporter which is the rocking center of the riding portion. Thus, the player can operate the riding portion with a reduced force. In addition, the player can operate the riding portion with his or her feet being separated apart from the base since the steps are located on the sides of the riding portion below the seat section. Accordingly, the player can operate the riding portion with the real drive of motorcycle. This improves the reality on operation.

According to a second aspect of the present invention, there is provided a simulator comprising: a base; a riding portion on the base; at least one handlebar located on the front side of the riding portion; and a display portion located in such a manner that the handlebar is positioned between the display portion and the riding portion; wherein the riding portion and handlebar are laterally rockable about the rear part of the riding portion and relative to a line connecting the rear part with the display portion; and wherein the riding portion and handlebar are tiltable toward the line connecting the rear part with the display portion on laterally rocking.

The player will less move the position of the weight and can operate the riding portion with a reduced force, since the riding portion and steering handlebar are rockable about the rear end of the riding portion.

In addition, the player can obtain a largely moving feel even if the player does not actually perform very large motion, since the player's upper-half body largely moves. Thus, the player can enjoy the game with an increased reality.

Since the riding portion and steering handlebar are tilted to the center on the laterally rocking motion of the riding portion, the steering handlebar will be positioned at a position opposite to the steering direction when the riding portion is tilted. Thus, the player's line-of-sight will always be directed to the display. Since the player can continue the game play without distracting from the display, the player can concentrate on the game play.

DETAILED DESCRIPTION OF THE PREFERRED EMBODIMENTS

Some preferred embodiments of the present invention will now be described in detail with reference to the drawings.

FIGS. 1 to 4 show a motorcycle game machine which is a simulator according to an embodiment of the present invention.

Figure 1:
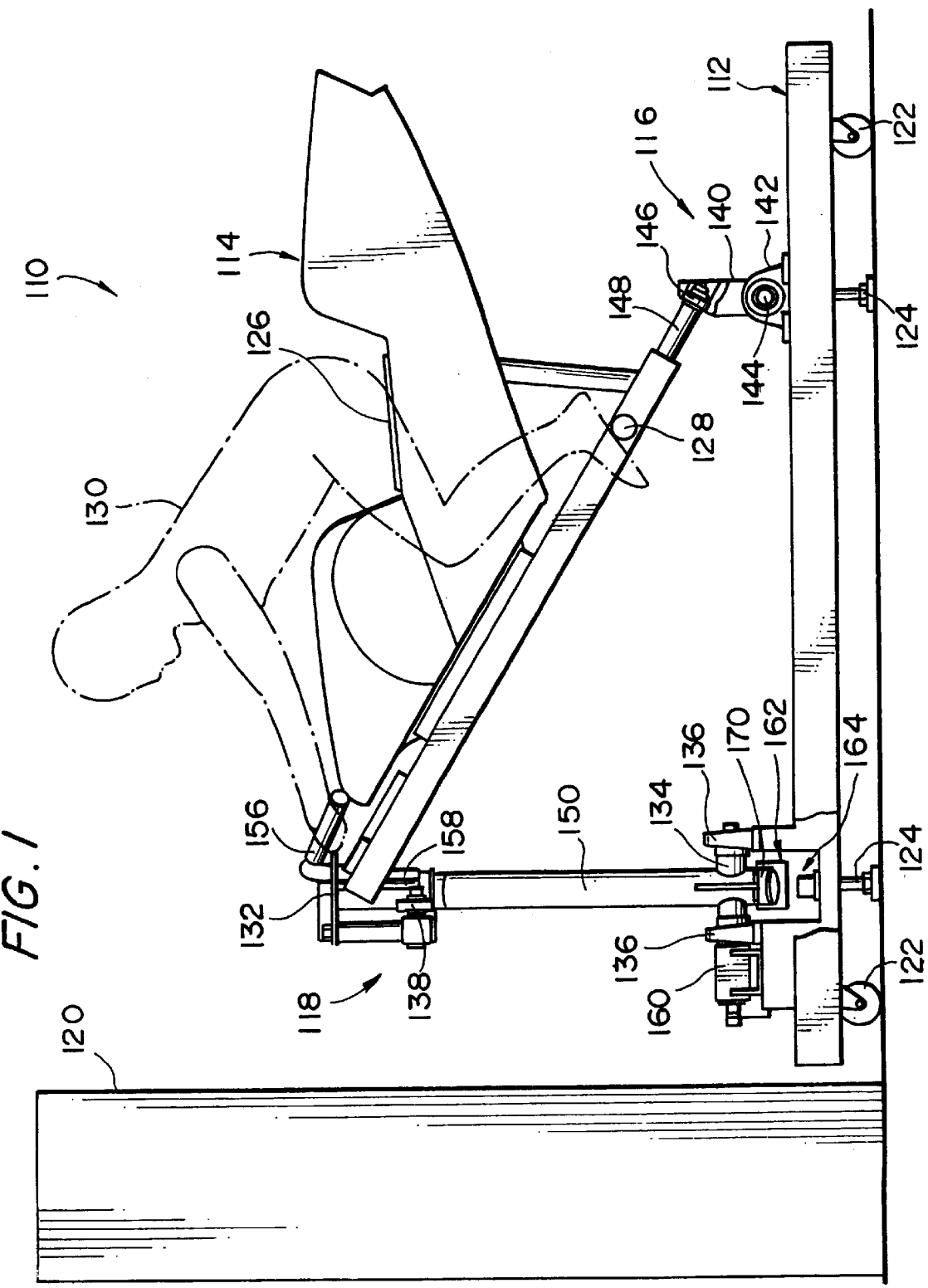
FIG. 1 is a side view of a motorcycle game machine according to one embodiment of the present invention, except the display.

Referring to FIG. 1, the motorcycle game machine 110 comprises a base 112, a riding portion 114 on the base 112, a rear end supporter 116 for supporting the rear end of the riding portion 114, a forward end supporter 118 for supporting the forward end of the riding portion 114 and a display 120 for representing a simulated picture in the motorcycle game.

The base 112 is of rectangular flat plate placed on the floor. The underside of the base 112 includes ground wheels 122 for permitting the base to move on the floor. The base 112 can also be fixed to the floor through stoppers 124.

The riding portion 114 is modeled on the shape of a motorcycle. More particularly, the riding portion 114 includes a seat 126 provided on the top of its rear part, and steps 128 provided under the seat 126.

A player 130 can ride on the riding portion 114 at the seat 126 with the player's feet placed on the steps 128.

The rear end supporter 116 includes a support block 140, bearings 142 and a horizontal shaft 144.

More particularly, the bearings 142 are fixedly mounted on the top of the base 112. The horizontal shaft 144 is disposed substantially parallel to a plane including the forward end supporter 118 as well as the top of the base 112, and rotatably mounted in the bearings 142. The support block 140 is a movable supporting member and one end thereof is fixed to the horizontal shaft 144 and extends substantially perpendicular to the horizontal shaft 144. Thus, the support block 140 is rotatable about and with the horizontal shaft 144. The other end of the support block 140 is connected to the riding portion 114 through a ball-and-socket joint structure.

The ball-and-socket joint structure refers to the ball-and-socket joint or similar structure. The ball-and-socket joint comprises a stem having a ball portion with a ball and another stem having a socket portion into which the ball portion is fitted. In this embodiment, a spherical bearing 146 as a socket is formed in the support block 140, and a spherical shaft 148 having a ball-shaped tip is formed in the rearward end of the riding portion 114. When the tip portion of the spherical shaft 148 is rotatably fitted into the spherical bearing 146, the riding portion 114 is connected to the support block 140.

The connection between the riding portion 114 and the support block 140 serves as a rocking point for the riding portion 114. The rocking point can be shifted fore-and-aft when the support block 140 is rotated.

Figure 2:
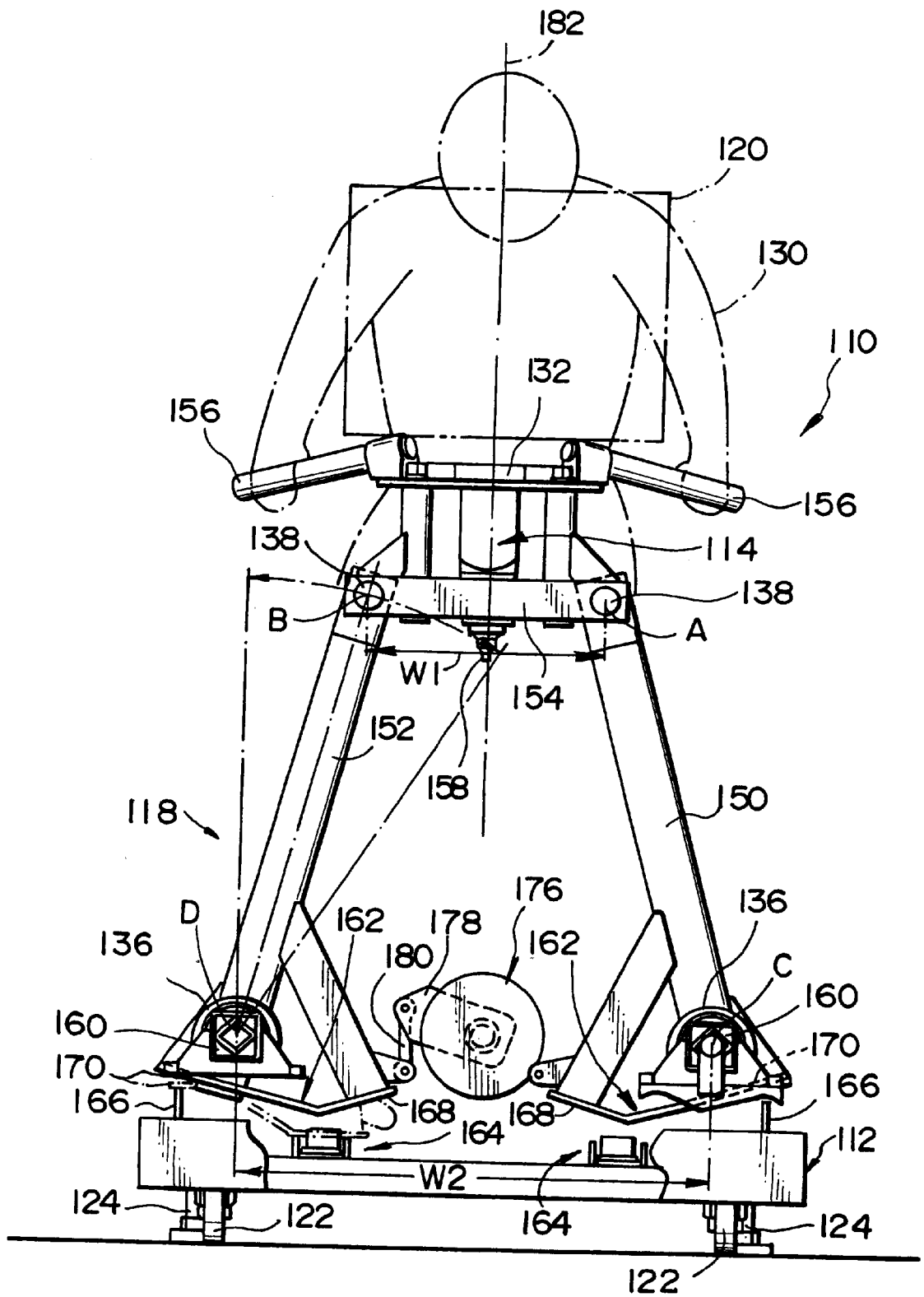
FIG. 2 is a schematic front view of the riding portion at its neutral position in this embodiment.
Figure 3:
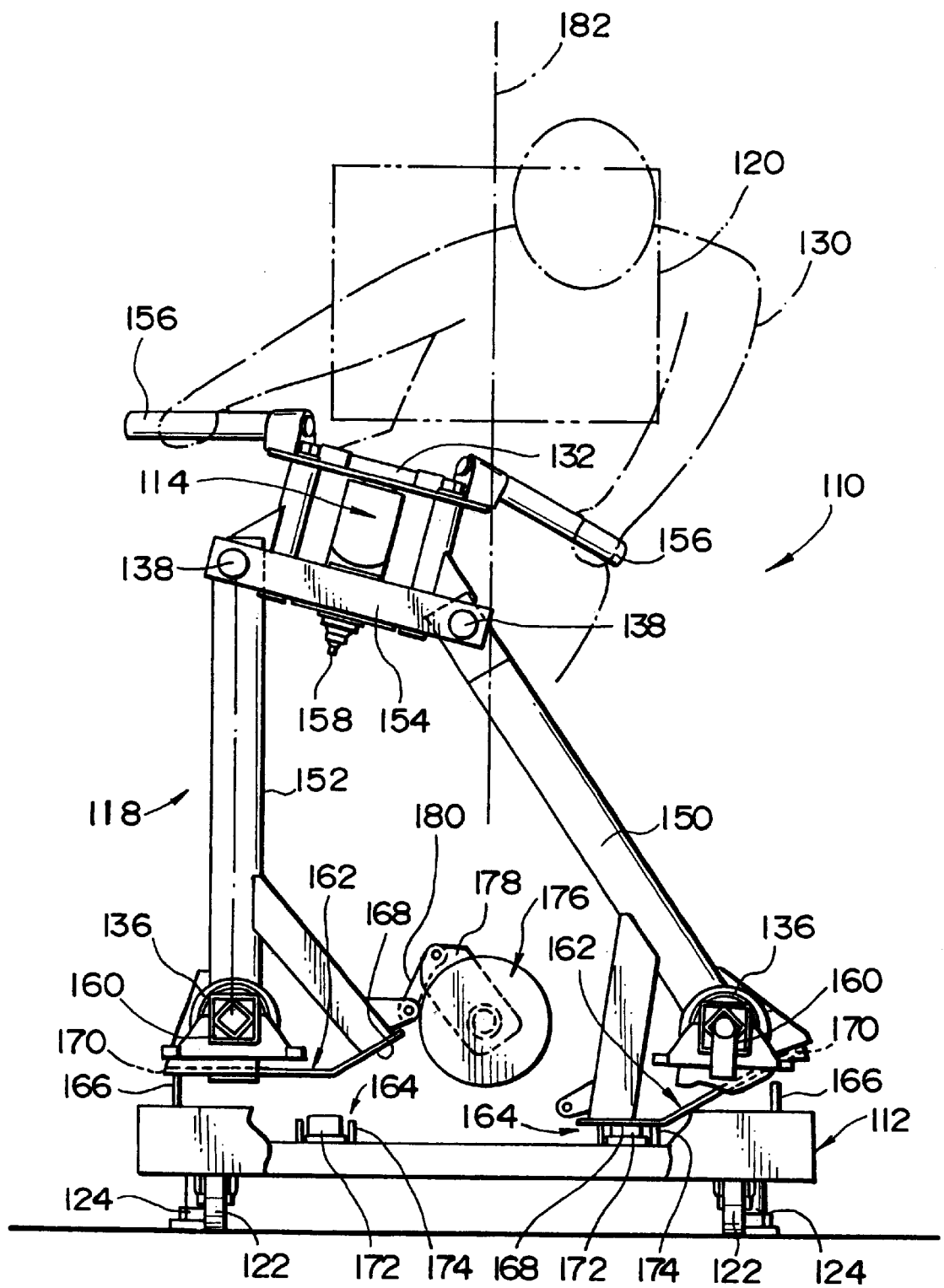
FIG. 3 is a schematic front view of the riding portion when the steering handlebar is operated for the leftward turn from the state of FIG. 2.
Figure 4:
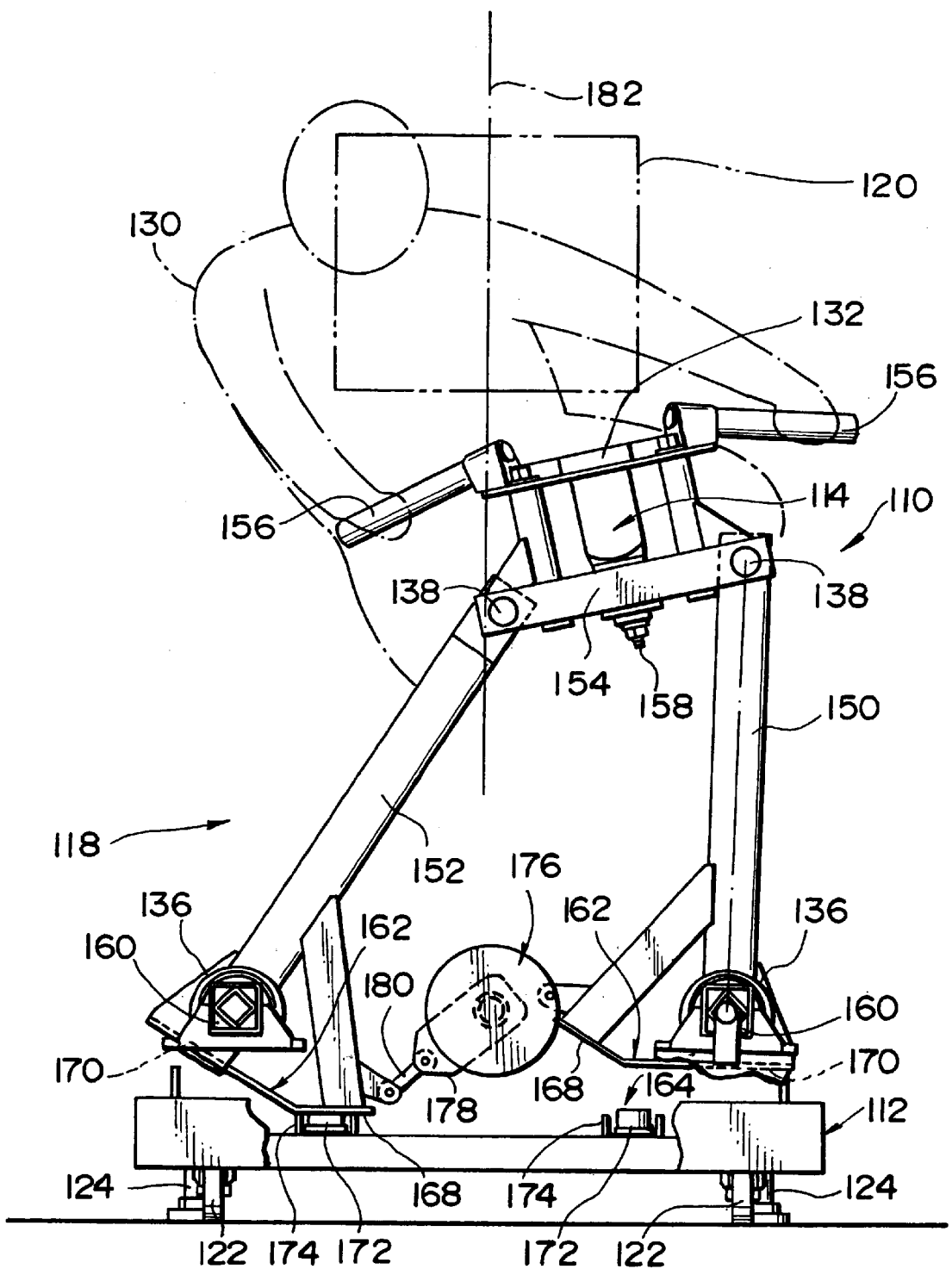
FIG. 4 is a schematic front view of the riding portion when the steering handlebar is operated for the rightward turn from the state of FIG. 2.

As shown in FIGS. 2 to 4, the forward end supporter 118 comprises a pair of left and right intermediate links 150, 152 and a top-side link 154. The top-side link 154 rotatably connects the top ends of the intermediate links 150 and 152 through two pairing elements A and B. On the other hand, the bottom ends of the intermediate links 150 and 152 are rotatably connected to the base 112 through two pairing elements C and D. In other words, the forward end supporter 118 is formed by a four-link mechanism which is rockable in a plane including the pair of intermediate links 150 and 152.

The distance between the pairing elements A and B on the side of the top-side link 154 is smaller than that between the pairing elements C and D on the side of the base 112. As shown in FIG. 2, thus, the forward end supporter 118 forms a substantially trapezoidal configuration at the neutral position.

More particularly, each of the pair of intermediate links 150 and 152 has a rotating shaft 134 located on the lower end thereof, as shown in FIG. 1. Each of the rotating shafts 134 extends substantially perpendicular to the plane including the pair of intermediate links 150 and 152 and integrally formed with the corresponding one of the pair of intermediate links 150 and 152. Each rotating shaft 134 is rotatably mounted on the base 112 through a pair of bearings 136 which are placed spaced apart from each other on the base 112. Thus, the upper end portions of the pair of intermediate links 150 and 152 are rockable about and with the respective rotating shafts 134. It is to be noted herein that the rotating shafts 134 in the pair of intermediate links 150 and 152 correspond to the lower pairing elements C and D, respectively.

On the other hand, the upper end portions of the pair of intermediate links 150 and 152 are connected to the opposite ends of the top-side link 154 through the respective ball-and-socket joints 138. Thus, any change in the distance between the top-side link and the rear end supporter on rocking can be absorbed by the ball-and-socket joints 138. In this connection, the ball-and-socket joints 138 correspond to the two pairing elements on the side of the top-side link 154.

The top-side link 154 has a handlebar support plate 132 formed thereon. The handlebar support plate 132 is integrally formed with the top-side link 154. The handlebar support plate 132 includes a pair of handlebars 156 formed thereon to extend laterally from the both ends. The handlebar support plate 132 forms a steering portion together with the pair of handlebars 156.

The top-side link 154 is connected to the front end of the riding portion 114. More particularly, as shown in FIG. 1, the riding portion 114 is connected to the top-side link 154 through a vertical pin 158 which is disposed to extend substantially perpendicular to the base 112. The riding portion 114 is rotatably connected to the top-side link 154 through this vertical pin 158 as a rotating shaft. As shown in FIG. 2, the vertical pin 158 is positioned substantially centrally between the two pairing elements A and B.

When the forward end supporter 118 is of such an arrangement, the entire forward end supporter 118 can easily be rocked in the lateral direction only by laterally moving any of the top-side link 154 and pair of intermediate links 150 and 152 relative to the riding portion 114 (see FIGS. 3 and 4). When the forward end supporter 118 is rocked in such a manner, the top-side link 154 is also laterally moved and tilted in a direction opposite to the direction of movement. Therefore, the riding portion 114 connected to the top-side link 154 is also moved in the same direction as that of the top-side link 154 and tilted in the same direction as that of the top-side link 154. As described, the connection between the rear end supporter 116 and the riding portion 114 is of ball-and-socket joint structure. As a result, the riding portion 114 can easily be tilted while being surely supported by the rear end supporter 116.

As described, the forward end supporter 118 can be rocked in the plane including the pair of intermediate links 150 and 152. When the top-side link 154 is moved laterally from the neutral position, therefore, the distance between the top-side link 154 and the rear end supporter 116 will be changed. Such a change in the distance is easily absorbed by the fact that the support block 140 in the rear end supporter 116 is rotated about the horizontal shaft 144. In other words, the change in the distance is absorbed by the fact that the rocking point in the rear end supporter 116 is shifted. In this embodiment, particularly, the rear end supporter 116 is connected to the riding portion 114 through the ball-and-socket joint structure while the pair of intermediate links 150 and 152 are connected to the top-side link 154 through the ball-and-socket joints 138. As a result, the riding portion 114 can smoothly be moved to absorb the change in the distance.

As shown in FIG. 1, the rotating shaft 134 on the lower end of each of the intermediate links 150 and 152 is provided with means for returning the riding portion 114 from its rocked position to its neutral position. Such returning means is in the form of a torsional rubber spring 160. Each of the torsional rubber springs 160 is formed by providing a compressed rubber in a square sleeve. The restoring force is provided by the reaction force in the compressed rubber.

In the first embodiment, thus, the riding portion 114 can be reduced in weight by locating the returning means below the riding portion 114, rather than the side of the riding portion 114. This can improve the operability in the riding portion 114.

If the reaction forces in the torsional rubber spring pair 160 for providing the restoring forces to the respective intermediate links 150 and 152 are different from each other, the reaction given to the player by the riding portion 114 can be varied.

For example, where a leftward cornering course is imaged, the reaction force in the torsional rubber spring 160 on the left-side link 150 is lowered. Thus, the reaction given to the player by the riding portion 114 will be weakened in the left-side link 150. The player thus can easily tilt the riding portion 114 leftward. In the simulator of this embodiment, therefore, the player can easily realize an action suitable for the state of that course.

In addition to the torsional rubber spring 160, the returning means may be accomplished by any other suitable means such as coil spring, torsion bar or torsional coil spring.

At the bottom of each of the intermediate links 150 and 152, there is provided a stopper plate 162.

The stopper plates 162 function as members for limiting the rocking angle when the pair of intermediate links 150 and 152 are rocked to a predetermined angle. In this embodiment, each of the stopper plates 162 is formed by a turned plate which includes one end extending toward an intermediate position between the bottoms of the intermediate links 150 and 152, the other end being fixedly mounted to the bottom of the corresponding intermediate link 150 or 152. In this case, the end portion of each stopper plate 162 extending toward an intermediate position between the bottoms of the intermediate links 150 and 152 will be referred to an inside piece 168 while the other end portion thereof fixedly mounted on the bottom of the corresponding intermediate link 150 or 152 will be referred to an outside piece 170.

For each of the stopper plates 162, the base 112 has a first stopper receiving member 164 and a second stopper receiving member 166.

As shown in FIGS. 3 and 4, each of the first stopper receiving members 164 is formed by a rubber member 172 and a metal member 174. Each of the first stopper receiving members 164 is located within the inside region between the pair of intermediate links 150 and 152. Each of the first stopper receiving members 164 is positioned at such a position that the corresponding one of the intermediate links 150 and 152 will be engaged by the inside piece 168 of the corresponding stopper plate 162 when the intermediate link 150 or 152 is rocked into the inside region.

On the contrary, each of the second stopper receiving members 166 is formed by a metal member. Each of the second stopper receiving members 166 is positioned at such a position that the second stopper receiving member 166 will be engaged by the outside piece 170 of the corresponding stopper plate 162 when the corresponding one of the intermediate links 150 and 152 is tilted outward.

By providing the stopper plates 162 and first and second stopper receiving members 164, 166, it can be avoided that the pair of intermediate links 150 and 152 are excessively rocked and tilted. Thus, the player can easily return the riding portion 114 from its rocked position to its neutral position. This improves the operability in the riding portion 114.

The first and second stopper receiving members 164, 166 may be mounted in any of the stopper plates 162 and base 112 unless they are between the stopper plates 162 and the base 112 to limit the angle of rocking.

As shown in FIGS. 3 and 4, the stopper plates 162 and the first and second stopper receiving members 164, 166 are formed such that one of the intermediate links 150 and 152 will be stopped at its substantially vertical position when the riding portion 114 is rocked to the maximum amount of rocking.

When one of the intermediate links 150 and 152 will be stopped at its substantially vertical position, the weights of the riding portion 114 and player 130 can surely be supported. Furthermore, the player 130 can easily return the riding portion 114 from the maximum rocked position to the neutral position.

The forward end supporter 118 further includes a locking means in the form of an electromagnetic brake 176. In this embodiment, as shown in FIGS. 2 to 4, the electromagnetic brake 176 is located at an intermediate position between the pair of stopper plates 162. The forward end supporter 118 can be maintained at its neutral position by the electromagnetic brake 176.

More particularly, the electromagnetic brake 176 is fixedly mounted on the base 112 through a fixing means (now shown). The electromagnetic brake 176 includes a rotating shaft on which a brake arm 178 is mounted. The brake arm 178 is connected to the lower end of the intermediate link 152 through a link arm 180.

The electromagnetic brake 176 is not actuated when the simulator is in power-on, as shown in FIGS. 3 and 4. During the game play, thus, the brake arm 178 will be rotated through the link arm 180 when the intermediate link 152 is tilted.

When the game is over and if the power is switched off with the riding portion 114 being in its neutral position, the rotating shaft of the electromagnetic brake 176 is locked to immobilize the brake arm 178 and also the riding portion 114.

Since the riding portion 114 is immobilized at its neutral position by the electromagnetic brake 176 before and after the game in such a manner, the player 130 can easily get on and off the riding portion 114.

The locking means may be accomplished by any other suitable means than the electromagnetic brake 176, such as an air cylinder or the like.

The display 120 is disposed in front of the riding portion 114 with the forward end supporter 118 being located therebetween. The display 120 is mainly designed to represent simulated images in the game.

The player 130 on the riding portion 114 can enjoy the game when he or she operates the riding portion 114 while looking the simulated images in the game represented on the forward display 120.

The operation of such a motorcycle game machine 110 will now be described with reference to FIGS. 2 to 4.

As shown in FIG. 2, the riding portion 114 is immobilized at its neutral position by the electromagnetic brake 176 before the game is started.

When in such a situation, the player 130 rides on the riding portion 114 and sits on the seat 126 with the player's feet being placed on the steps 128 and with the player's hands grasping the handlebars 156, the body of the player 130 will be positioned facing the display 120.

When the motorcycle game machine 110 is powered on by the player 130, the electromagnetic brake 176 is released. Thereafter, the player 130 operates the riding portion 114 according to the situation of game while looking the simulated game image on the display 120. For example, if a leftward cornering course appears in the simulated image on the display 120, the player 130 may perform a cornering action for leftward turn.

More particularly, the cornering action may be performed by the player 130 moving the weight thereof on the riding portion 114 and operating the riding portion 114 though the handlebars. For example, when the player wants to turn leftward, he or she moves his or her weight to load the left-side steps 128 on the riding portion 114. Alternatively, the player may move the left-side handlebars downward. As shown in FIG. 3, thus, the top-side link 154 is translated rightward relative to the player 130 from the neutral position 182 and tilted leftward relative to the player 130, through the four-link mechanism.

Being concurrent with such a motion, the front end of the riding portion 114 is rocked about the rear end supporter 116 in the direction of translation of the top-side link 154. At the same time, substantially the whole of the riding portion 114 is tilted in the same direction as the top-side link is tilted.

In such a case, the weight of the player 30 is on the rear part of the riding portion 114, that is, on the rear end supporter 116 which is a rocking center. Therefore, the player 130 can operate the riding portion 114 with a reduced force.

In such a state, the upper-half body of the player 130 is largely tilted leftward while the handlebars 156 mounted on the top-side link 154 are moved rightward relative to the player 130. This provides, to the player 130, such a feel in which the handlebars 156 are turned leftward. Thus, the player 130 can feel a real operative feeling extremely similar to the actual operability of motorcycle.

Since in this case, the front end of the riding portion 114 is moved leftward relative to the neutral position 182, the line-of-sight of the player 130 will not largely be out of the screen on the display 120. Thus, the line-of-sight of the player 130 can always be maintained facing the screen on the display 120. The player 130 can obtain a natural operability since the player can perform the cornering action while looking the image on the display 120.

Since the player 130 can enjoy the game play while always looking toward the cornering direction, the reality in the game can be improved.

Since the handlebars 156 are tilted with tilting of the top-side link 154, the player 130 can obtain such a feel as the actual motorcycle is controlled by the player.

Since at this time, the right-side link 152 is in its substantially vertical position on the maximum amount of rocking, the weights of the riding portion 114 and player 130 can surely be supported.

Furthermore, the riding portion 114 can smoothly be rocked through the ball-and-socket joints 138 and 146.

When it is wanted to return the riding portion 114 from this leftward cornering state to the neutral position 182, the player 130 loads the right-side step 128 with his or her foot. Alternatively, the player 130 may downward push the right-side handlebar 156 or pull the left-side handlebar 156 toward the player. Thus, the player can easily return the riding portion 114 to the neutral position 182 by utilizing the restoring force in the torsional rubber springs 160.

Since at this time, the right-side link 152 is placed in its substantially vertical position even on the maximum amount of rocking, the riding portion 114 can more easily be returned to the neutral position by the player under the restoring force in the torsional rubber springs 160.

When it is wanted to shift the riding portion 114 from the neutral position of FIG. 2 to the rightward cornering state of FIG. 4, the player 130 loads the right-side step 128 with his or her right-side foot or downward pushes the right-side handlebar 156. Thus, the rightward cornering state of FIG. 4 can easily be accomplished in opposition to the leftward cornering state.

On this cornering action, the riding portion 114 can be maintained at any tilted position according to the magnitude of load on the step 128 as well as the degree of movement of the handlebars 156. Therefore, the player can easily and simply control the riding portion 114 according to the angle of the corner.

When the reaction forces in the left- and right-side torsional rubber springs 160 are different from each other to differ the left- and right-side restoring forces from each other, the reaction from the riding portion 114 to the player 130 may be set suitably depending on various situations.

Figure 5:
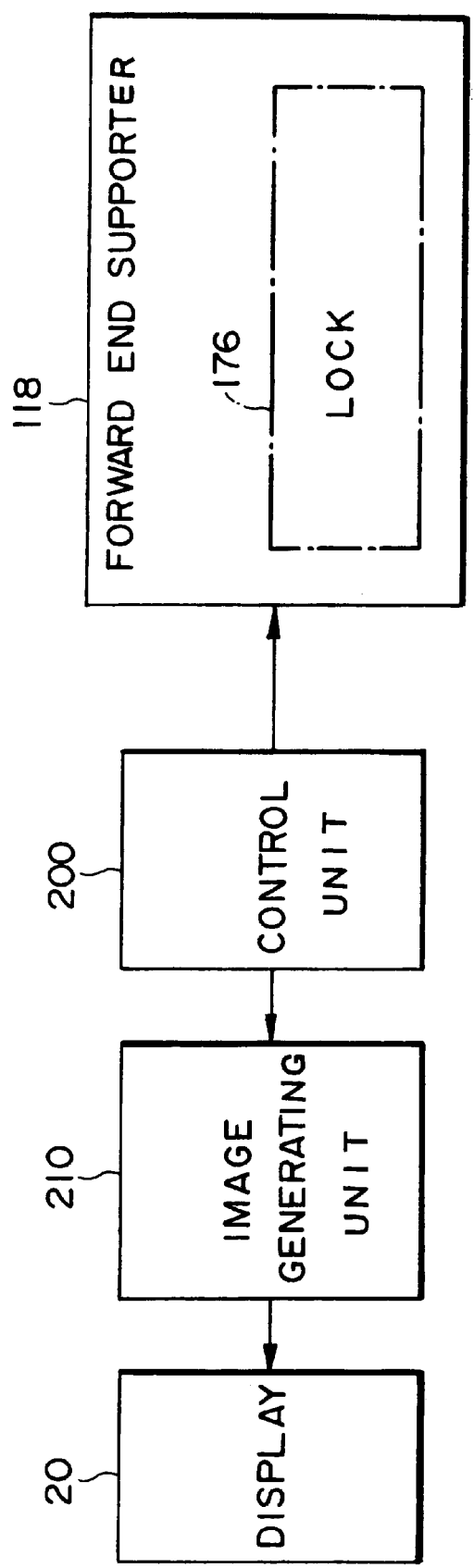
FIG. 5 is a block diagram schematically illustrating the function of this embodiment.

The functions of the motorcycle game machine 110 according to this embodiment are shown in the functional block diagram of FIG. 5.

In this figure, a control unit 200 performs various processings such as control of the whole motorcycle game machine 110, instructions to various blocks in the motorcycle game machine 110, computation of the game and so on. These functions can be accomplished by hardware devices such as CPU (CISC or RISC type), DSP, ASIC (gate array or the like) or by a given program (game program).

An image generating unit 210 generates simulated images for the motorcycle game according to the instructions from the control unit 200. The simulated image generated by the image generating unit 210 will be represented on the display 20.

The forward end supporter 118 is controlled by the control unit 200 such that the forward end supporter 118 will act suitably for the simulated image on the display 20. For example, when the simulated image on the display 20 represents an irregular road, the motion of the forward end supporter 118 will be controlled such that vibration similar to the actual vibration due to the irregular road is given to the riding portion 114. The locking means 176 is also controlled by the control unit 200.

FIGS. 6 to 21 show a motorcycle game machine using a simulator constructed according to another embodiment of the present invention.

Figure 15:
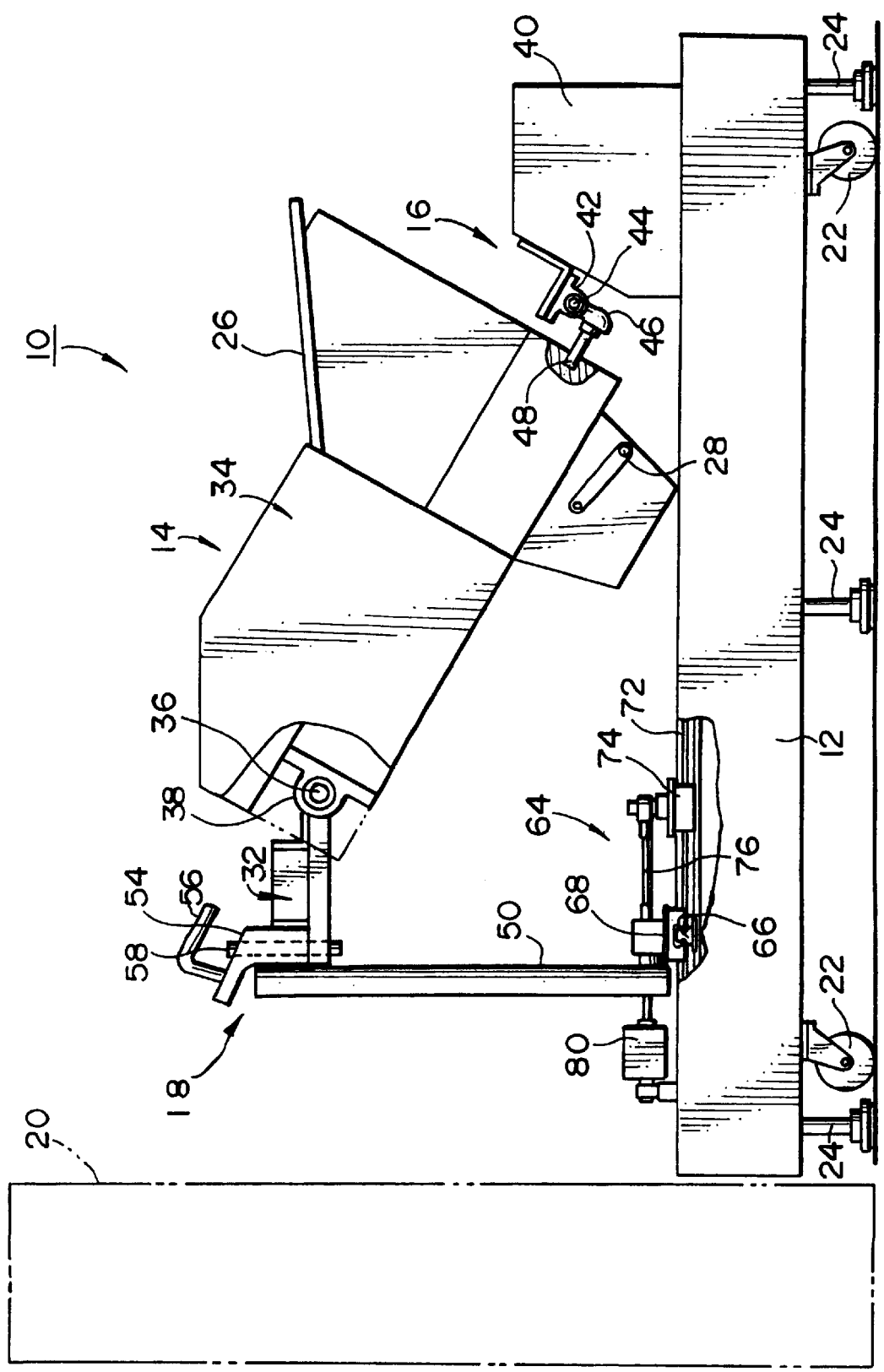
FIG. 15 is a side view of the entire motorcycle game machine according to the embodiment of FIG. 6.

As seen from FIG. 15, this motorcycle game machine 10 comprises a base 12, a riding portion 14 on the base 12, a rear end supporter 16 for supporting the rear end of the riding portion 14, a forward end supporter 18 for supporting the forward end of the riding portion 14 and a display 20 for representing simulated images of motorcycle game.

The base 12 is of rectangular flat plate placed on the floor. The underside of the base 12 includes ground wheels 22 for permitting the base to move on the floor. The base 12 can also be fixed to the floor through stoppers 24.

The riding portion 14 is modeled on the shape of a motorcycle. More particularly, the riding portion 14 includes a seat 26 provided on the top of its rear part, and steps 28 provided under the seat 26.

A player 30 (see FIGS. 12 to 14) can ride on the riding portion 14 at the seat 26 with the player's feet being placed on the steps 28.

The riding portion 14 has a front riding section 32 and a rear riding section 34 including the seat 26 and the steps 28. The front and rear riding sections 32, 34 are connected to each other.

Figure 10:
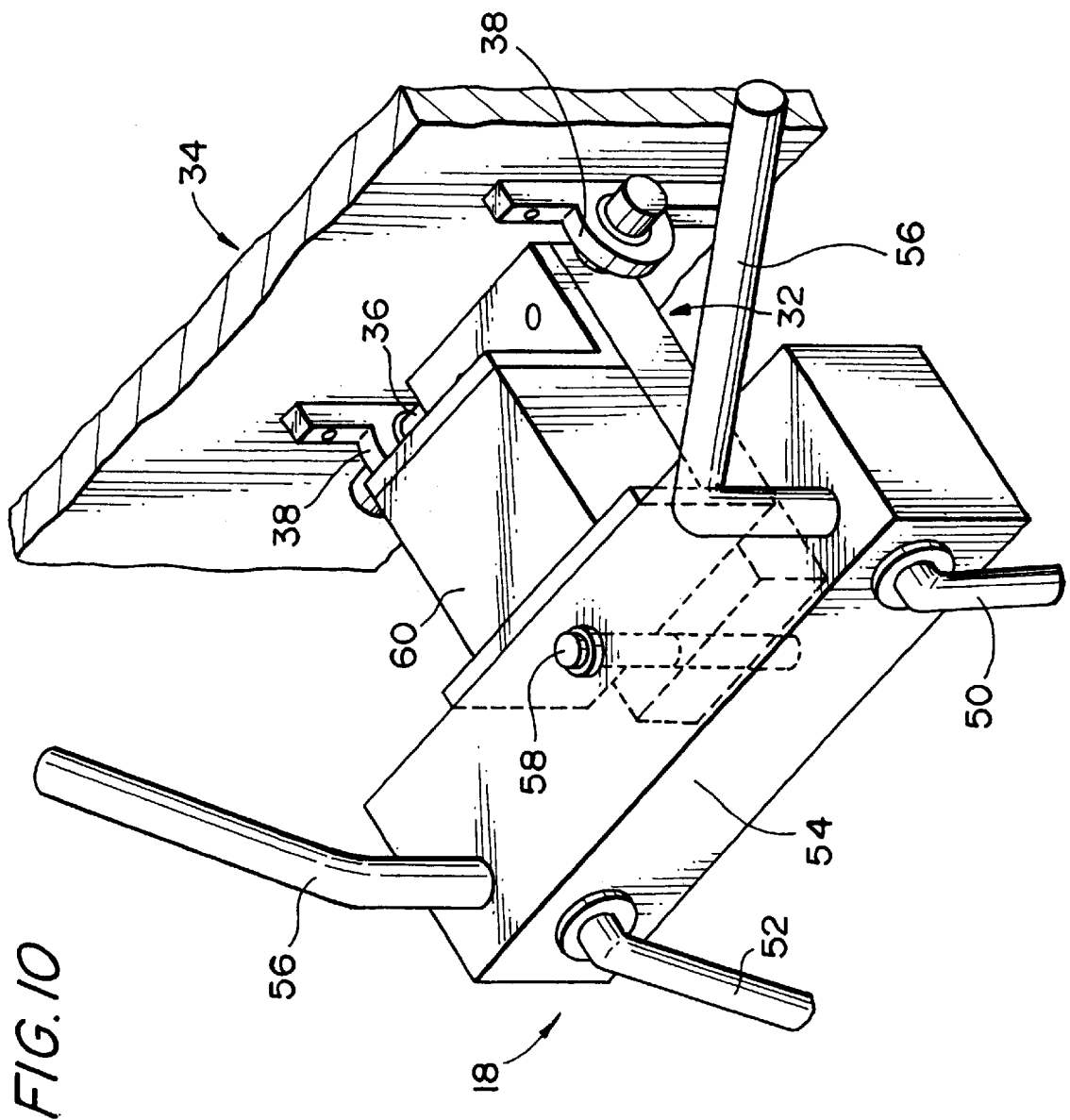
FIG. 10 is a fragmentally enlarged and perspective view, illustrating the mounting of the front riding section in the embodiment of FIG. 6.
Figure 11:
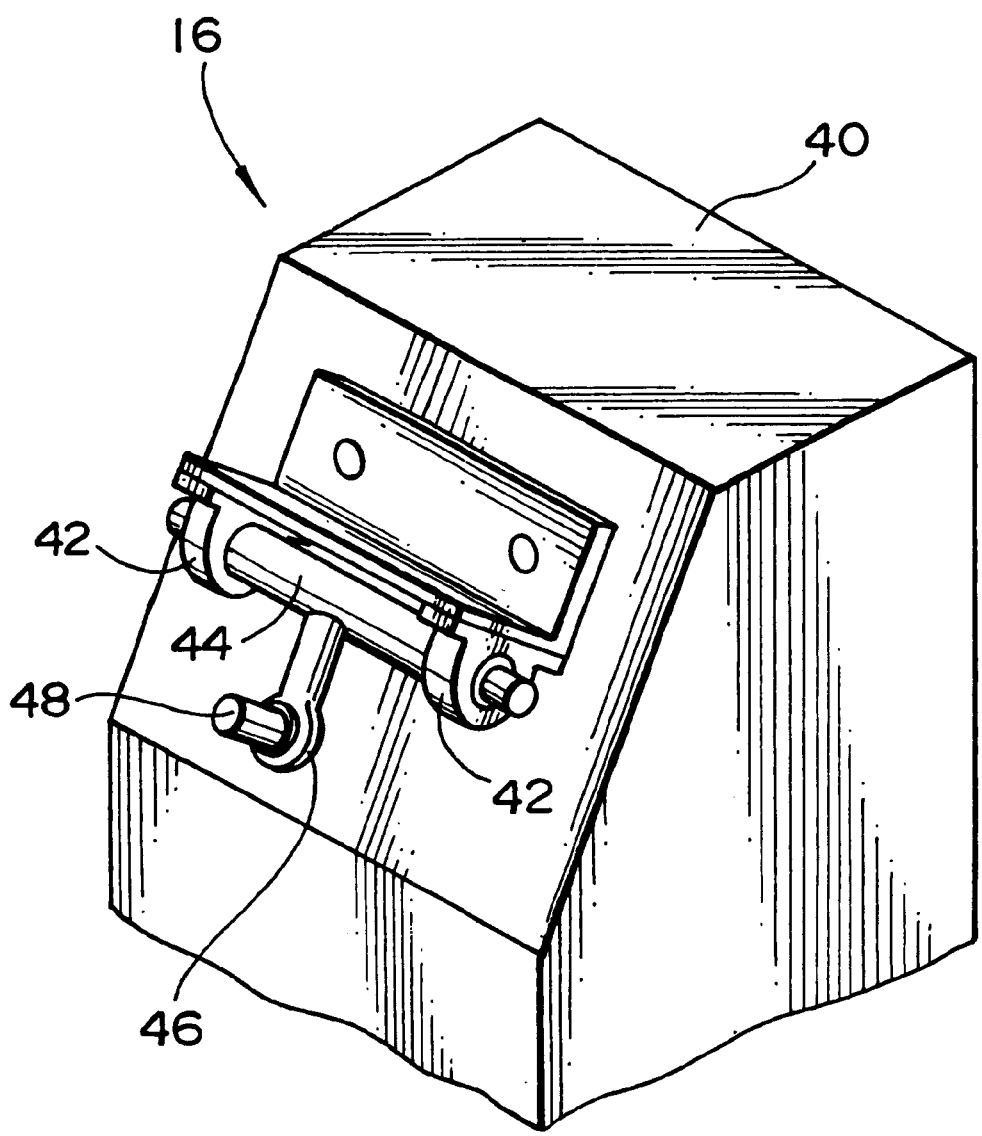
FIG. 11 is a fragmentally enlarged and perspective view illustrating the state of the rear end supporter in the embodiment of FIG. 6.

More particularly, as shown in FIG. 10, the front riding section 32 includes a horizontal shaft 36 located at the rear part thereof. The horizontal shaft 36 is rotatably supported by bearings 38 that are provided at the front part of the rear riding section 34 so that the front riding section 32 is connected to the rear riding section 34.

Figure 6:
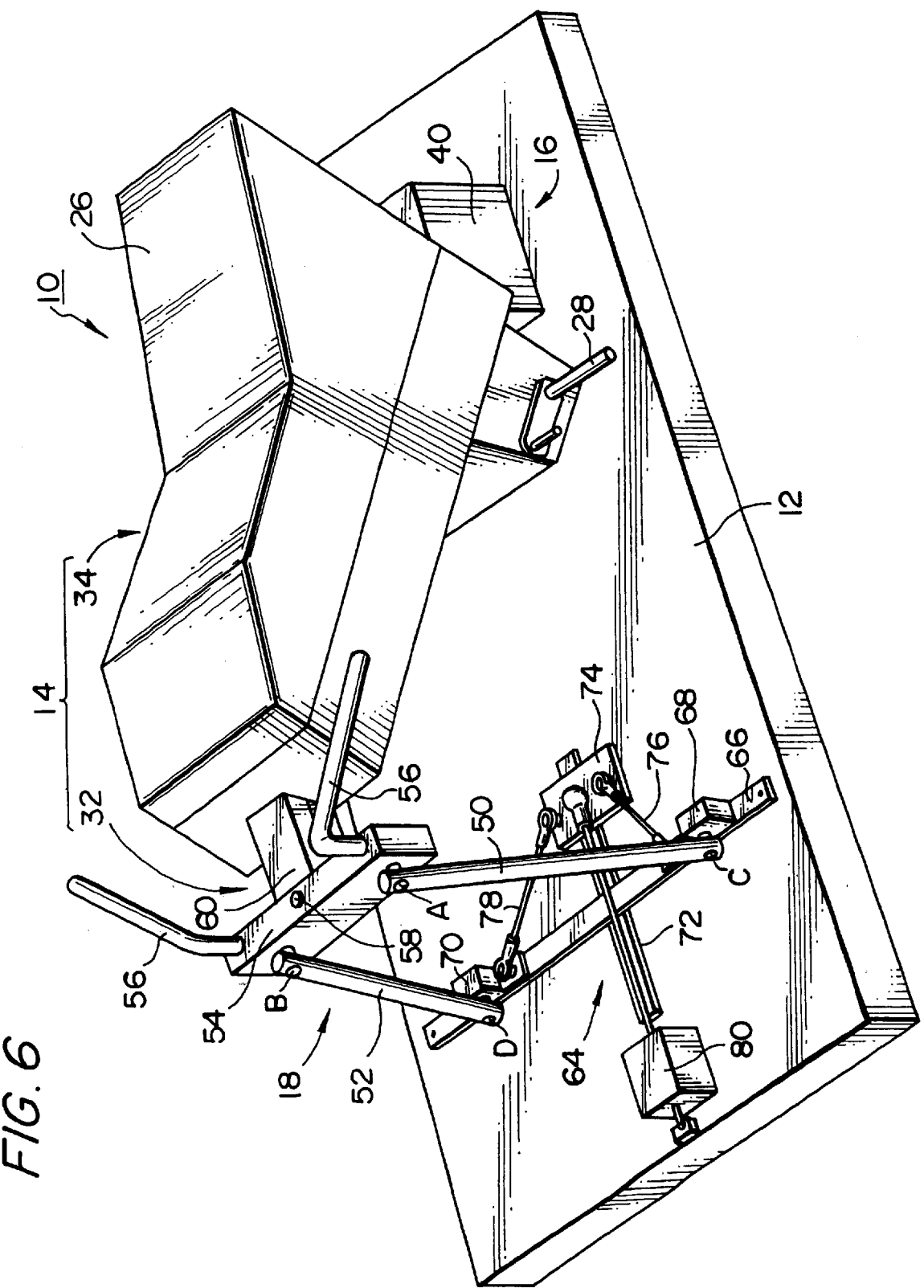
FIG. 6 is a perspective view of a motorcycle game machine according to another embodiment of the present invention, except the display.
Figure 7:
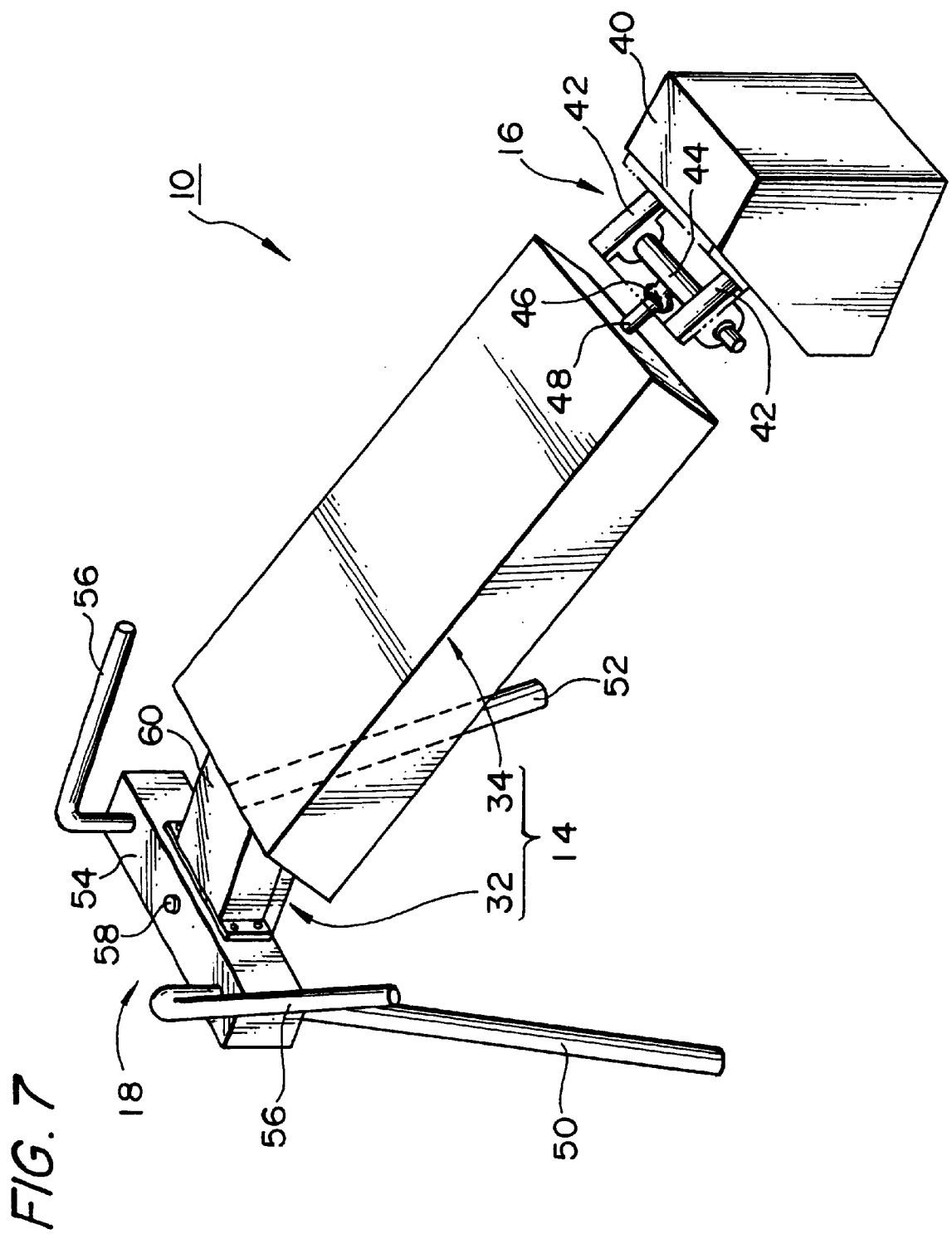
FIG. 7 is a schematic and perspective view of the riding portion according to the embodiment of FIG. 6 at its neutral position as viewed from the back.
Figure 8:
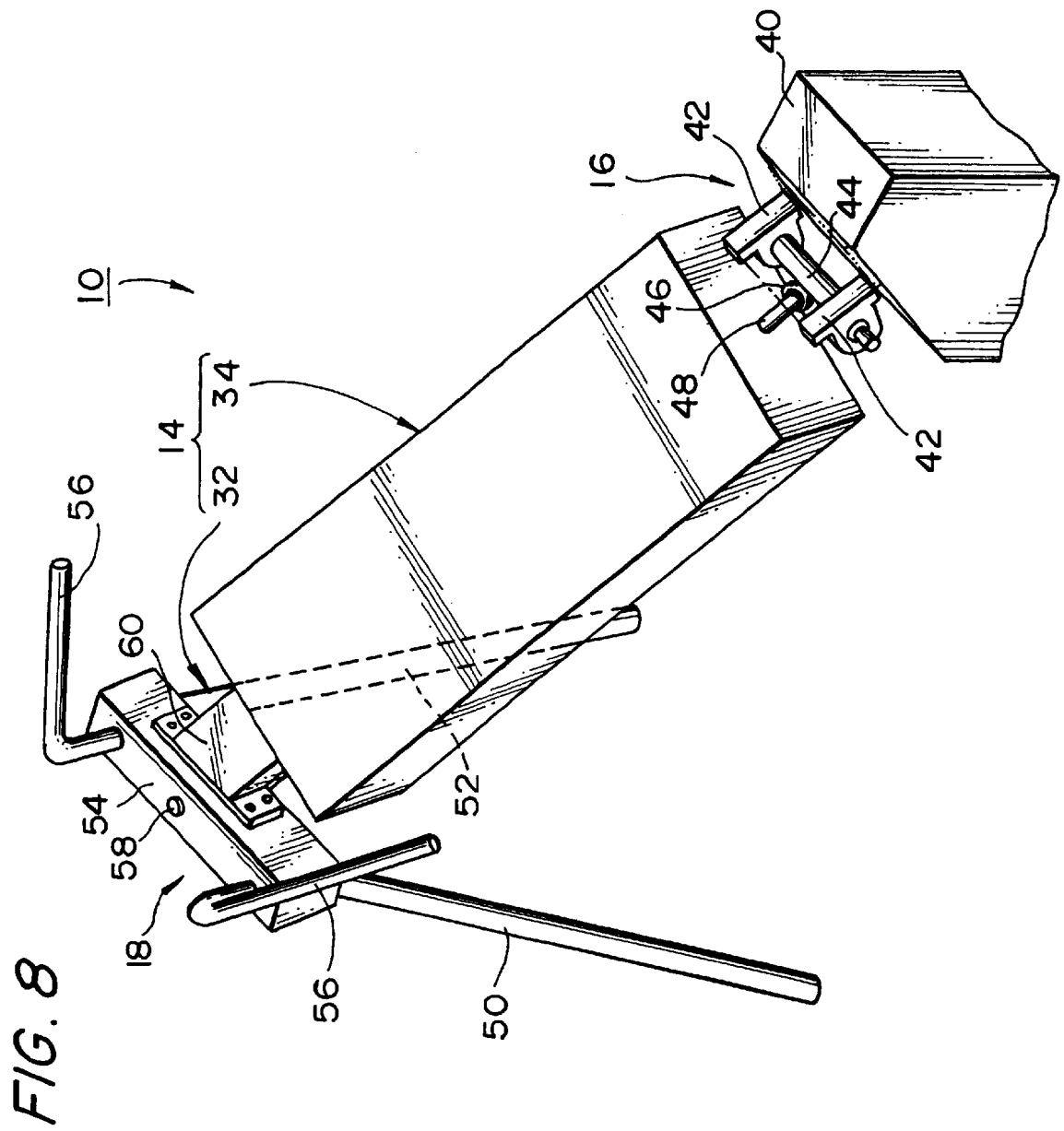
FIG. 8 is a schematic and perspective view of the riding portion when the steering handlebar is operated for the leftward turn from the state of FIG. 7.
Figure 9:
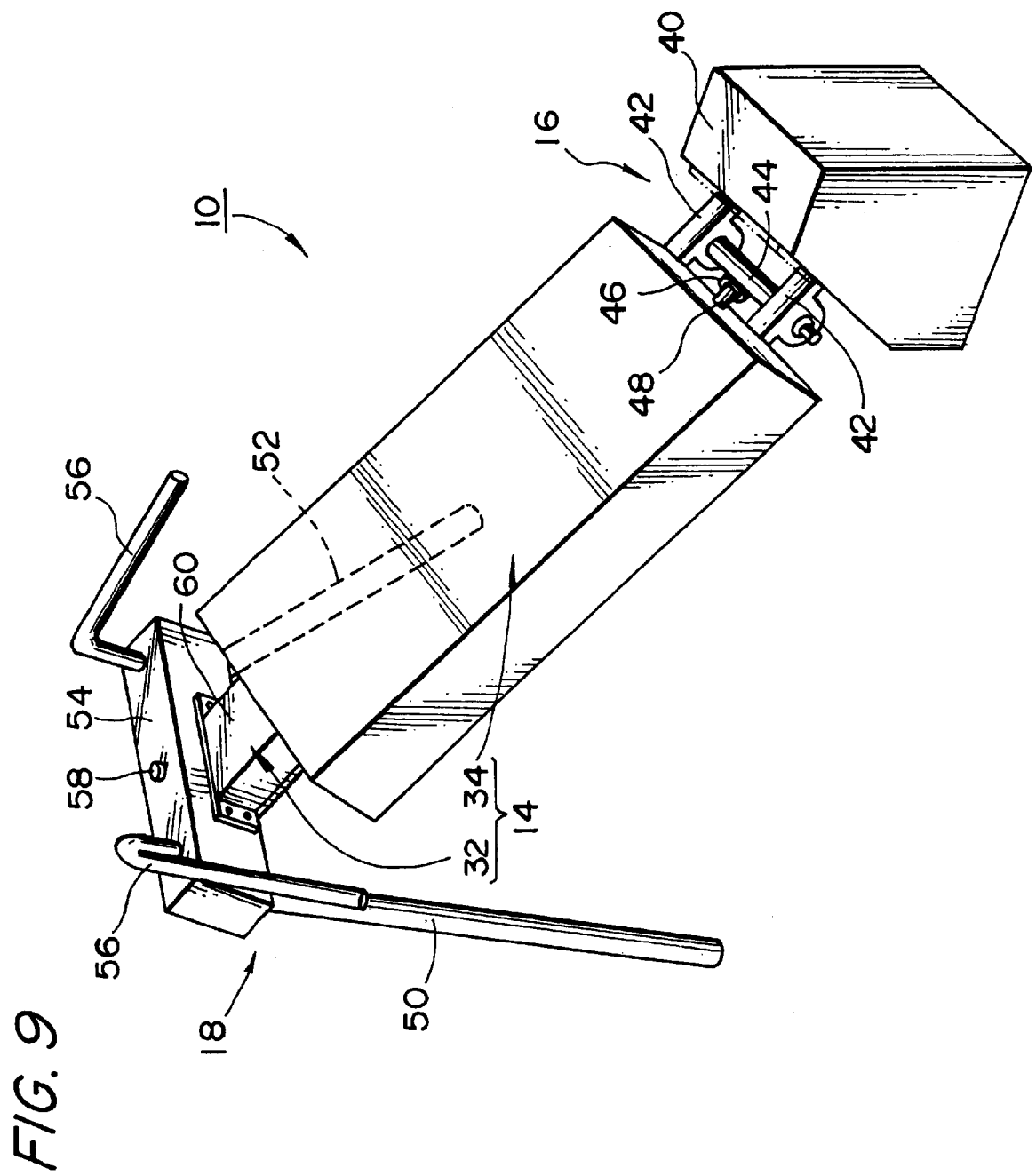
FIG. 9 is a schematic and perspective view of the riding portion when the steering handlebar is operated for the rightward turn from the state of FIG. 7.

Referring to FIGS. 7–9, 11 and 15, the rear end supporter 16 comprises a support platform 40, a pair of bearings 42, a horizontal shaft 44 and a spherical bearing 46. More particularly, as shown in FIG. 6, the support platform 40 is positioned behind the rear riding section 34, on the base 12. The pair of bearings 42 are located to extend outward from the surface of the support platform 40 facing the rear riding section 34. The horizontal shaft 44 is located substantially parallel to a plane including the forward end supporter 18 as well as the surface of the base 12. The horizontal shaft 44 is rotatably supported at the opposite ends by the bearings 42. The spherical bearing 46 is integrally formed with the horizontal shaft 44 to extend substantially perpendicular to the horizontal shaft 44. The spherical bearing 46 is connected to a spherical shaft 48 which is provided at the rear end of the rear riding section 34. In other words, the riding portion 14 is connected to the rear end supporter 16 through a ball-and-socket joint structure.

As shown in FIGS. 7–9, 12–14 and 16, the forward end supporter 18 comprises a pair of intermediate links 50 and 52 rockably mounted on the base 12 and a top-side link 54 connected between the top ends of the intermediate links 50 and 52. The top-side link 54 is movably connected between the top ends of the intermediate links 50 and 52 through two pairing elements A and B. On the other hand, the bottom ends of the intermediate links 50 and 52 are movably connected to the base 12 through two pairing elements C and D. In other words, the forward end supporter 18 is formed by a four-link mechanism which is rockable in a plane including the intermediate links 50 and 52.

Figure 16:
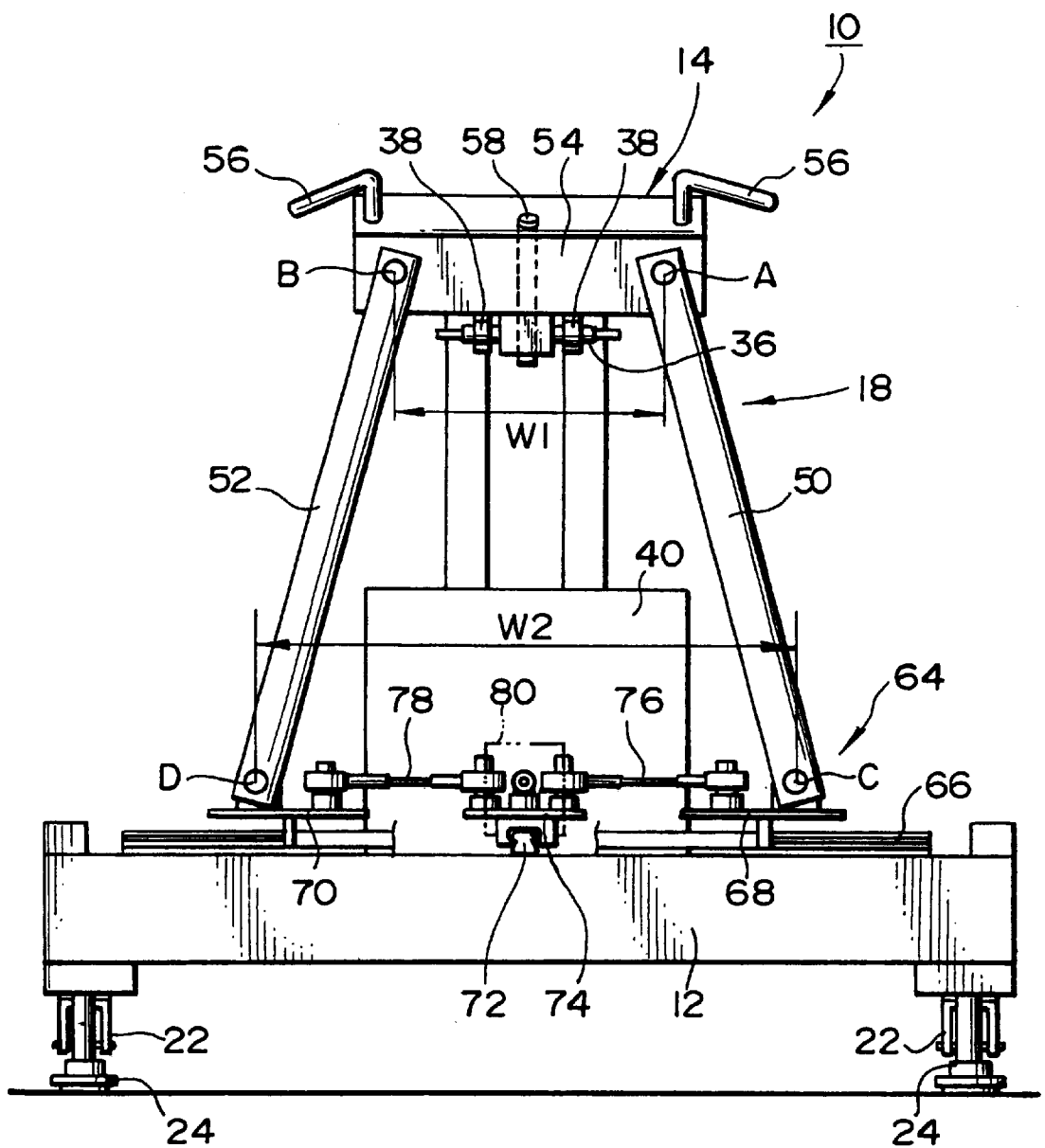
FIG. 16 is a front view of the motorcycle game machine according to the embodiment of FIG. 6.
Figure 17:
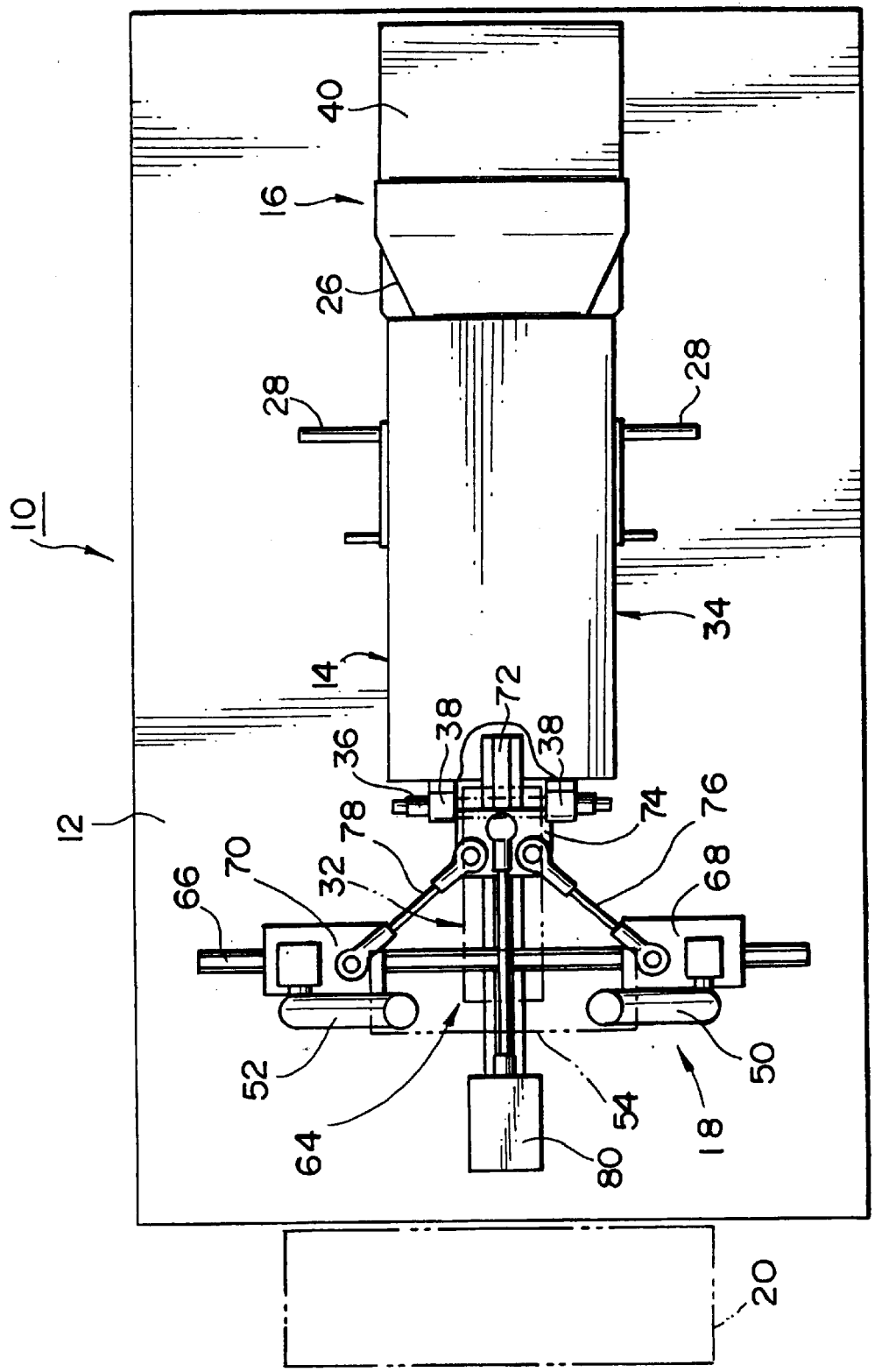
FIG. 17 is a plan view of the outline of a distance control mechanism for pairing elements in the motorcycle game machine according to the embodiment of FIG. 6.
Figure 18:
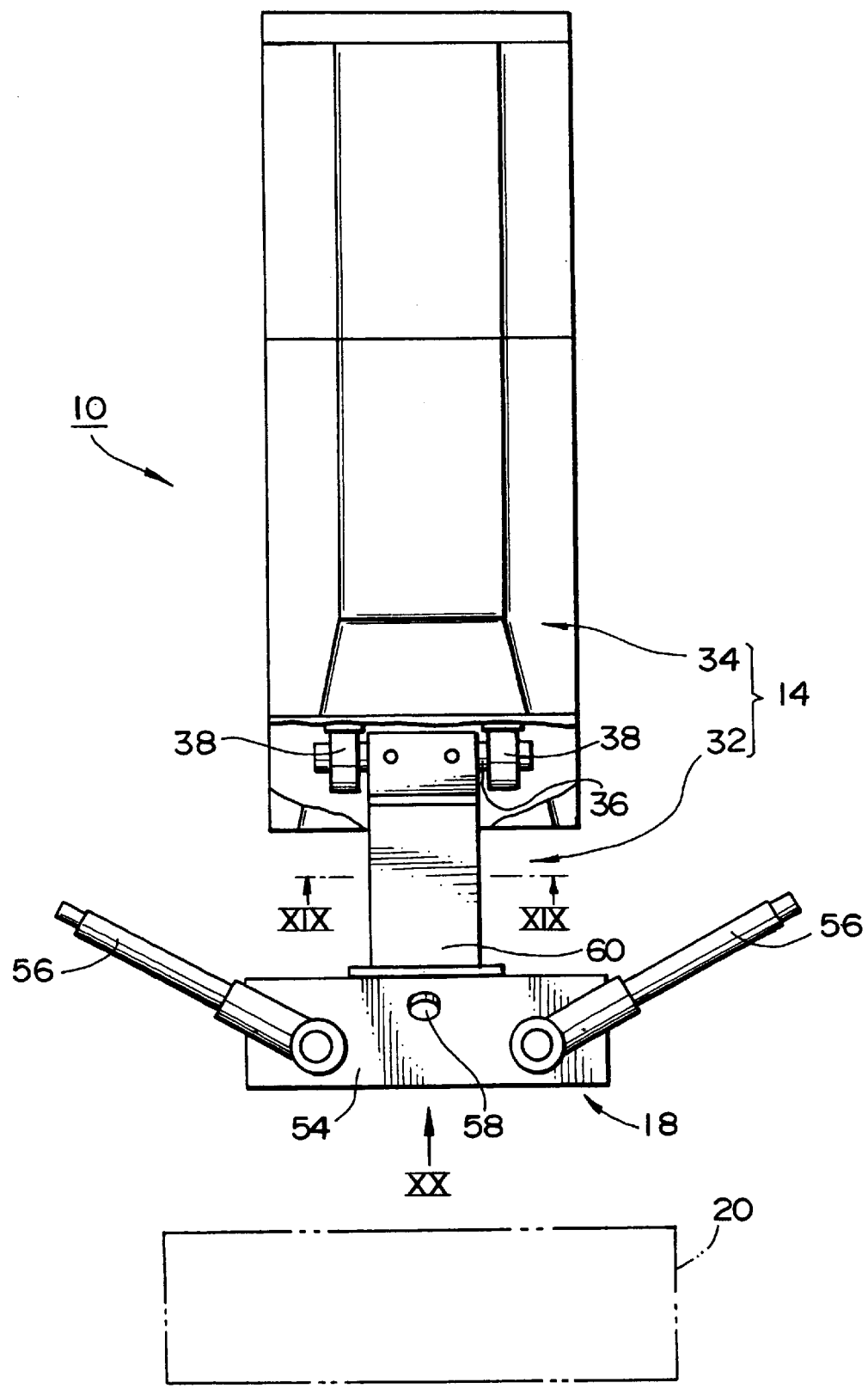
FIG. 18 is a plan view illustrating the relationship between the riding portion and forward end supporter and the display.
Figure 19:
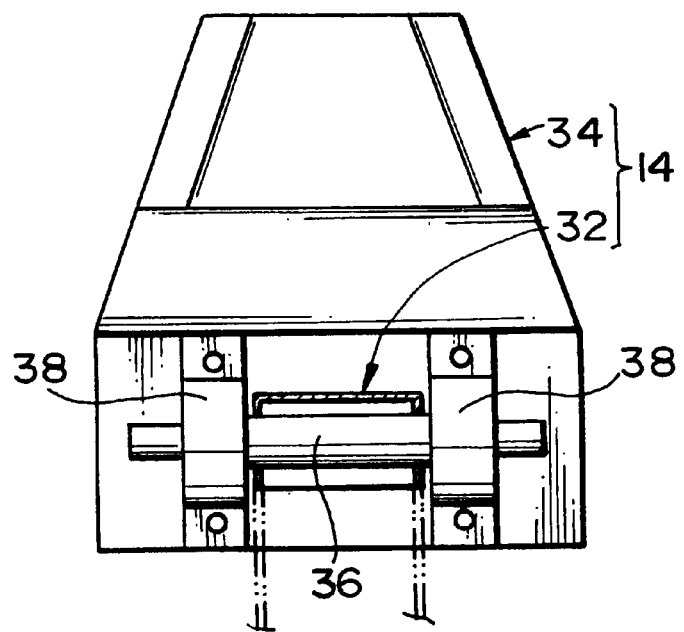
FIG. 19 is an enlarged cross-sectional view taken along a line XIX—XIX in FIG. 18.
Figure 20:
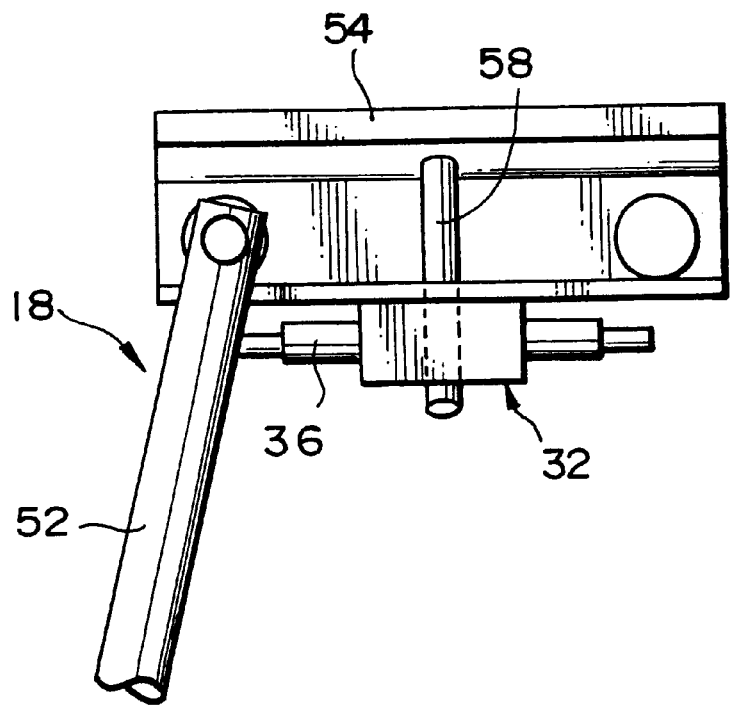
FIG. 20 is a fragmentary front view illustrating the mounting of the top-side link and front riding section as viewed from the XX side of FIG. 18.

The distance between the pairing elements A and B on the side of the top-side link 54 is selected to be smaller than that between the pairing elements C and D of the base 12. As shown in FIG. 16, thus, the forward end supporter 18 forms a substantially trapezoidal configuration at the neutral position.

The top-side link 54 supports the front end of the front riding section 32.

The top-side link 54 is of box-shaped configuration and includes a steering portion which is formed by handlebars 56 extending laterally from the opposite ends of the top.

As shown in FIG. 10, the top-side link 54 supports the front riding section 32 through a vertical pin 58 which is provided at a position substantially intermediate between the handlebars 56. The front riding section 32 is thus rotatable about the longitudinal axis in the vertical pin 58.

When the forward end supporter 18 is of such an arrangement, the entire forward end supporter 18 can easily be rocked in the lateral direction only by laterally moving any of the top-side link 54 and intermediate links 50 and 52 relative to the riding portion 14. When the forward end supporter 18 is rocked in such a manner, the top-side link 54 is also laterally moved and tilted in a direction opposite to the direction of movement. Therefore, the riding portion 14 connected to the top-side link 54 is also moved in the same direction as that of the top-side link 54 and tilted in the same direction as that of the top-side link 54. As described, the connection between the rear end supporter 16 and the riding portion 14 is of ball-and-socket joint structure. As a result, the riding portion 14 can easily be tilted while being surely supported by the rear end supporter 16.

As described, the forward end supporter 18 can be rocked in the plane including the pair of intermediate links 50 and 52. When the top-side link 54 is moved laterally from the neutral position, therefore, the distance between the top-side link 54 and the rear end supporter 16 will be changed. Such a change in the distance is easily absorbed by rotating the spherical bearing 46 of the rear end supporter 16 about the horizontal shaft 44. In other words, the change in the distance is absorbed by shifting the rocking point in the rear end supporter 16. In this embodiment, particularly, the rear end supporter 16 is connected to the riding portion 14 through the ball-and-socket joint structure while the front riding section 32 is connected to the rear riding section 34 through the horizontal shaft 36 for relative rotation. As a result, the riding portion 14 can smoothly be moved for absorption of the change in the distance.

The connection between the top-side link 54 of the forward end supporter 18 and the front riding section 32 includes a restoring rubber 60 which functions means for returning the riding portion 14 from a rocked position to the neutral position.

More particularly, the restoring rubber 60 is located on the front riding section 32 between the front end of the rear riding section 34 and the rear face of the top-side link 54. When the riding portion 14 is rocked, the restoring rubber 60 is compressed between the rear riding section 34 and the top-side link 54 to create a large restoring force from the reaction force in the restoring rubber 60.

In this embodiment, the forward end supporter 18 includes a distance control mechanism 64 for the pairing elements that controls the distance W2 between the lower pairing elements C and D in the four-link mechanism.

The distance control mechanism 64 for the pairing elements comprises a first slide rail 66 and a pair of first sliders 68 and 70. More particularly, the first slide rail 66 is located on the base 12 at a position corresponding to the forward end supporter 18 and extends substantially parallel to the top-side link 54. The first sliders 68 and 70 are slidably mounted on the first slide rail 66. The first sliders 68 and 70 are connected to the bottom ends of the intermediate links 50 and 52 through the pairing elements C and D. Thus, the bottom ends of the intermediate links 50 and 52 are respectively connected to the first sliders 68 and 70 for rotation about the respective pairing elements C and D.

A second slide rail 72 is provided on the base 12 to extend perpendicular to the first slide rail 66.

The second slide rail 72 slidably supports a second slider 74. The second slider 74 is connected to the first sliders 68 and 70 through a pair of link arms 76 and 78. The link arms 76 and 78 are pivotally connected to the first sliders 68 and 70 and the second slider 74, respectively. The second slider 74 is connected to an air cylinder 80 as a drive device. When the second slider 74 is moved along the second slide rail 72 by the air cylinder 80, the first sliders 68 and 70 are moved toward or away from each other through the link arms 76 and 78. Thus, the distance between the lower pairing elements C and D in the intermediate links 50 and 52 can be changed.

When the distance between the lower pairing elements C and D in the intermediate links 50 and 52 is changed in such a manner, the motorcycle game machine 10 can accomplish various running conditions.

For example, on low-speed running, the distance between the lower pairing elements C and D in the intermediate links 50 and 52 may be increased to lower the top-side link 54 and the front part of the riding portion 14 so that the player can realize the stable running state in its lowered position.

On acceleration, the distance between the lower pairing elements C and D in the intermediate links 50 and 52 may be decreased to raise the top-side link 54 and the front part of the riding portion 14 so that the player can realize the unstable running state in its raised position.

Particularly, on low-speed running, the motorcycle game machine 10 can accomplish a sharply cornering state by largely tilting the riding portion 14. On the other hand, on high-speed running, the motorcycle game machine 10 can make the sharp cornering difficult by less tilting the riding portion 14.

If the air cylinder 80 is suitably controlled to vibrate the handlebars 56, this may realize a state in which the motorcycle runs on an irregular road.

Figure 21:
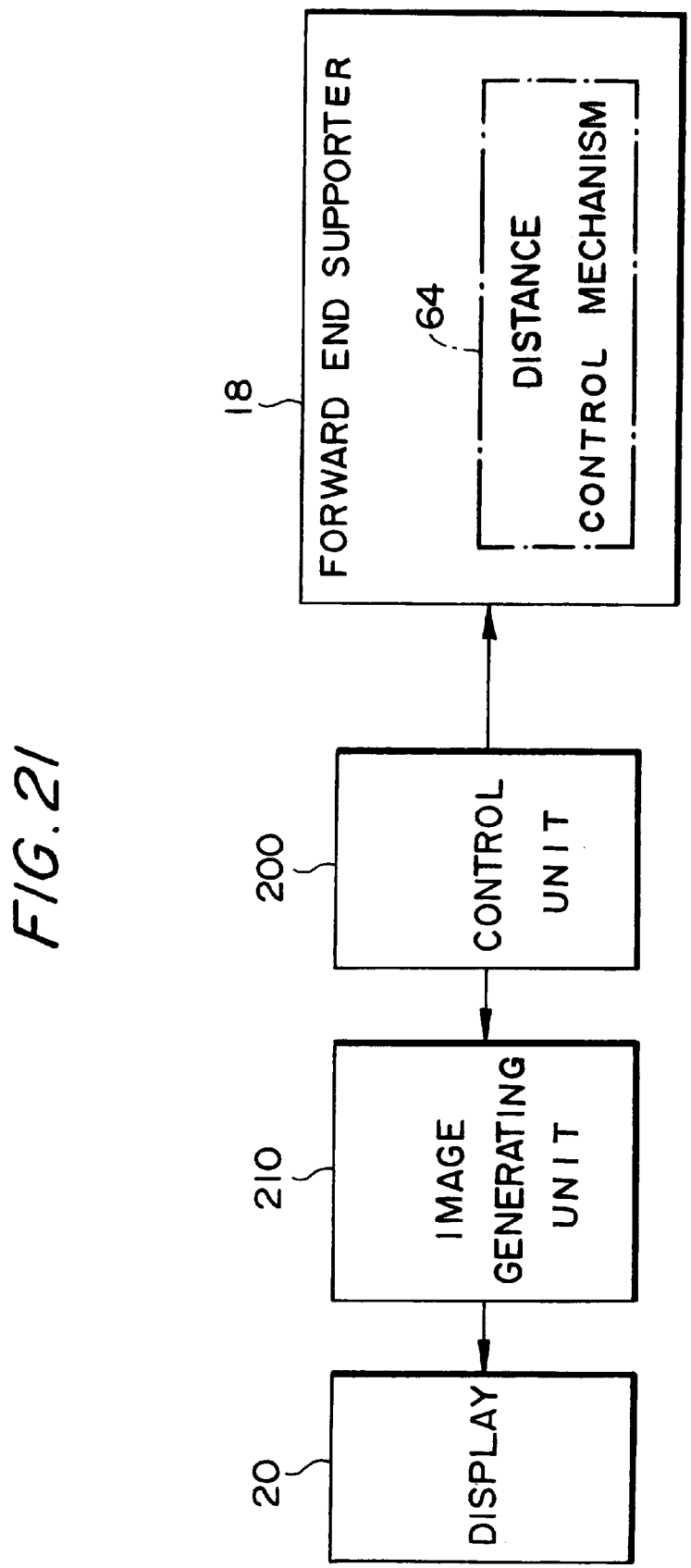
FIG. 21 is a block diagram schematically illustrating the function of the embodiment of FIG. 6.

The operation of distance control mechanism 64 for pairing elements is controlled by the control unit 200 as shown in the functional block diagram of FIG. 21.

The display 20 is provided in front of the riding portion 14 with the forward end supporter 18 being located therebetween.

In such a manner, the player 30 can enjoy the game when he or she rides on the riding portion 14 and operates the riding portion 14 while looking the simulated image of game on the display 20.

The operation of such a motorcycle game machine 10 will now be described mainly with reference to FIGS. 12 to 14.

Figure 12:
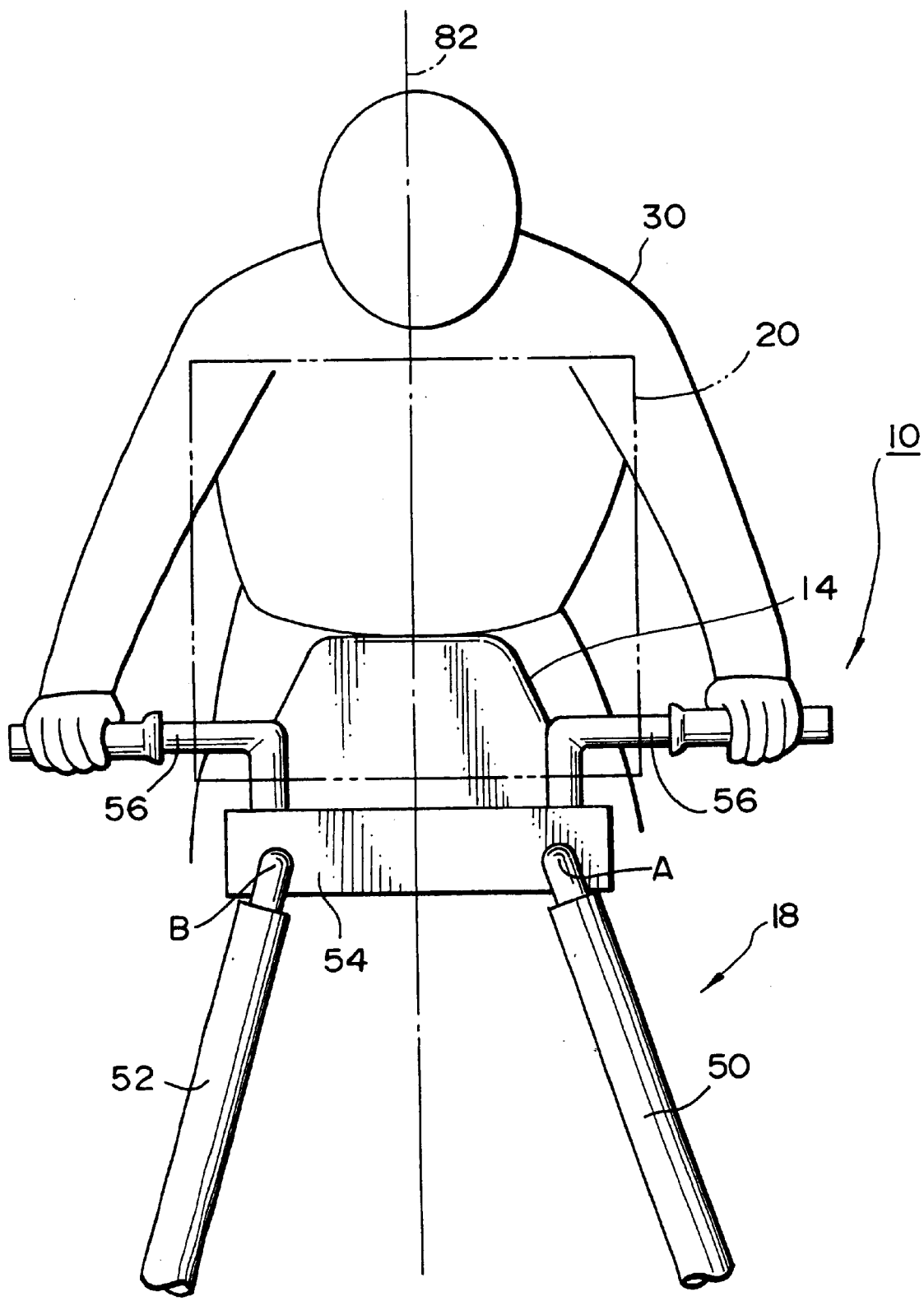
FIG. 12 is a fragmentary front view illustrating the state of the riding portion and player at the neutral position.
Figure 13:
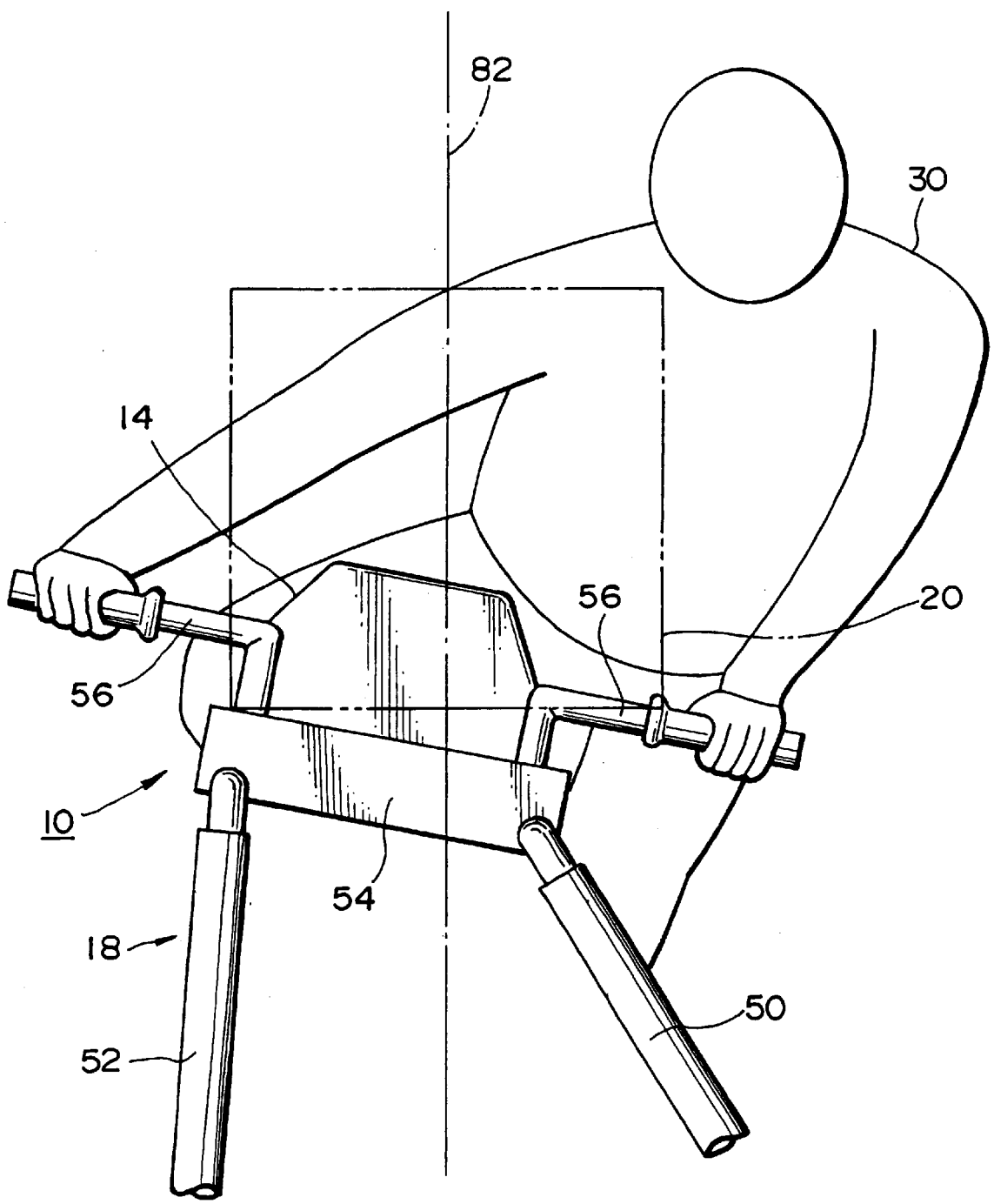
FIG. 13 is a fragmentary front view illustrating the state of the riding portion and player when in the leftward cornering state from the state of FIG. 12.

When the player 30 rides on the riding portion 14 and sits on the seat 26 with the player's feet being placed on the steps 28 and with the player's hands grasping the handlebars 56, the riding portion 14 will be positioned at the neutral position 82, as shown in FIG. 12. The body of the player 30 will properly be positioned facing the display 20.

When in such a situation, the motorcycle game machine 10 is powered on, the player can operate the riding portion 114 according to the situation of game while looking the simulated game image on the display 20.

Under such a condition, for example, when the display 20 represents a simulated image in which the motorcycle runs on a straight road at low-speed, the speed of the simulated motorcycle is sensed, and the riding portion 14 is so controlled that the position of the top-side link 54 is lowered by the distance control mechanism 64 for pairing elements for providing a lower and stable driving state. On high-speed running, the riding portion 14 is so controlled that the top-side link 54 is raised for providing a higher and unstable driving state. In such a manner, the simulator of the present invention may realize any of various running states.

If the simulated image shows a state in which the motorcycle runs on an irregular road, the distance control mechanism 64 for the pairing elements is actuated to vibrate the top-side link 54. When such vibration is transmitted to the player 30 through the handlebars 56, the player 30 can feel an improved reality.

If a leftward cornering state, for example, is shown in the simulated image, the player 30 moves his or her weight to load the left-side steps 28 on the riding portion 14. Alternatively, the player 30 may move the left-side handlebars downward. As shown in FIG. 13, thus, the top-side link 54 is translated rightward relative to the player 30 from the neutral position 82 and tilted leftward relative to the player 30, through the four-link mechanism.

Being concurrent with such a motion, the front end of the riding portion 14 is rocked about the rear end supporter 16 rightward relative to the player 30. At the same time, substantially the whole of the riding portion 14 is tilted in the same direction as the top-side link 54 is tilted.

In such a case, the weight of the player 30 is in the rear part of the riding portion 14, that is, on the rear end supporter 16 which is a rocking center. Therefore, the player 30 can operate the riding portion 14 with a reduced force.

In such a state, the upper-half body of the player 30 is largely tilted leftward while the handlebars 56 mounted on the top-side link 54 are moved rightward relative to the player 30. This provides, to the player 30, such a feel in which the handlebars 56 are turned leftward. Thus, the player 30 can feel a real operative feeling extremely similar to the actual operability of motorcycle.

Since in this case, the front end of the riding portion 14 is moved leftward relative to the neutral position 82, the line-of-sight of the player 30 will not largely be out of the screen on the display 20. Thus, the line-of-sight of the player 30 can always be maintained facing the screen on the display 20. The player 30 can obtain a natural operability since the player can perform the cornering action while looking the image on the display 20.

Since the player 30 can enjoy the game play while always looking toward the cornering direction, the reality in the game can be improved.

Since the handlebars 56 are tilted with tilting of the top-side link 54, the player 30 can obtain such a feel as the actual motorcycle be controlled by the player.

Furthermore, the distance control mechanism 64 for the pairing elements can realize the more real control of the riding portion 14 during cornering as in straight running. More particularly, on deceleration, the top-side link 54 is lowered to largely tilt the handlebars 54. This accomplishes a sharply cornering state. On the other hand, on acceleration, the top-side link 54 is raised to less tilt the top-side link 54. This makes the sharply cornering state difficult.

When it is wanted to return the riding portion 14 from this leftward cornering state to the neutral position 82, the player 30 loads the right-side step 28 with his or her foot. Alternatively, the player 30 may push the right-side handlebar 56 downward or pull the left-side handlebar 56 toward the player. Thus, the player can easily return the riding portion 14 to the neutral position 82 by utilizing the restoring force from the restoring rubber 60.

Figure 14:
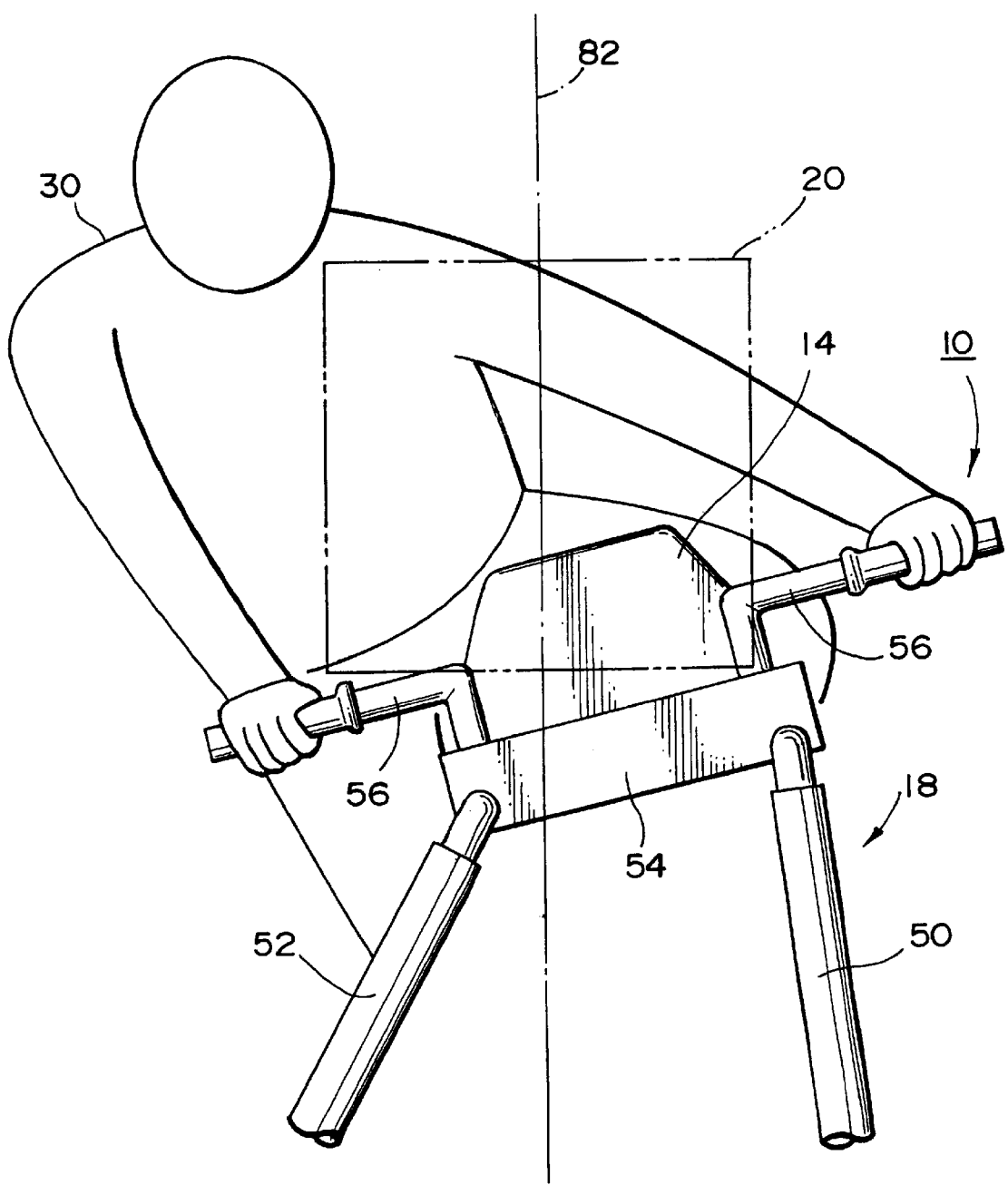
FIG. 14 is a fragmentary front view illustrating the rightward cornering state from the state of FIG. 12.

When it is wanted to shift the riding portion 14 from the neutral position of FIG. 12 to the rightward cornering state as shown in FIG. 14, the player 30 loads the right-side step 28 with his or her right-side foot or pushes the right-side handlebar 56 downward. Thus, the rightward cornering state of FIG. 14 can easily be accomplished in opposition to the leftward cornering state.

On this cornering action, the riding portion 14 can be maintained at any tilted position according to the magnitude of load on the step 28 as well as the degree of movement of the handlebars 56. Therefore, the player can easily and simply control the riding portion 14 according to the angle of the corner.

Figure 22:
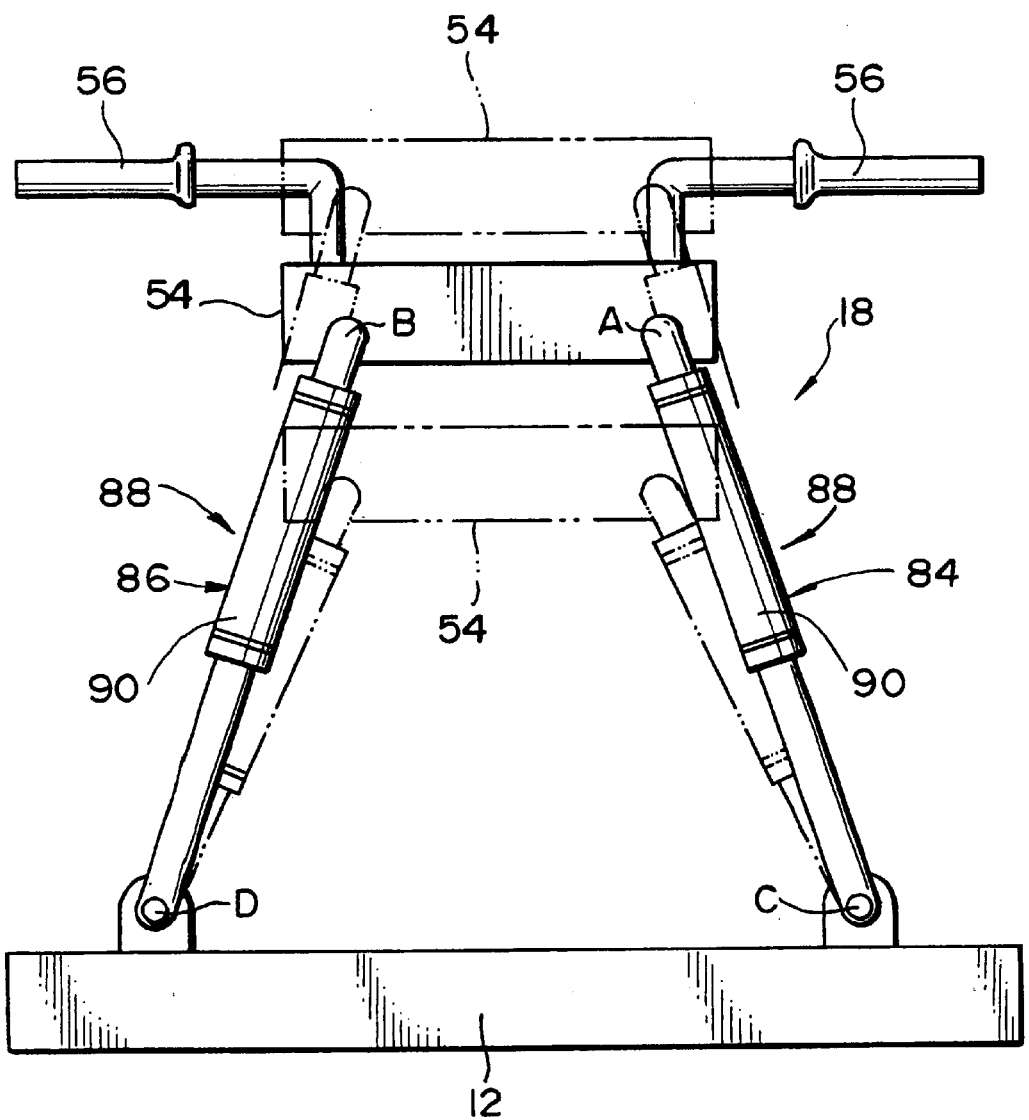
FIG. 22 is a schematic front view of a motorcycle game machine according to still another embodiment of the present invention.

FIG. 22 shows a motorcycle game machine utilizing a simulator which is still another embodiment of the present invention.

This motorcycle game machine 10 has a link-length changing mechanism 88 for changing a pair of intermediate links 84 and 86 in length, in place of the distance control mechanism 64 for the pairing elements on the forward end supporter 18.

Figure 23:
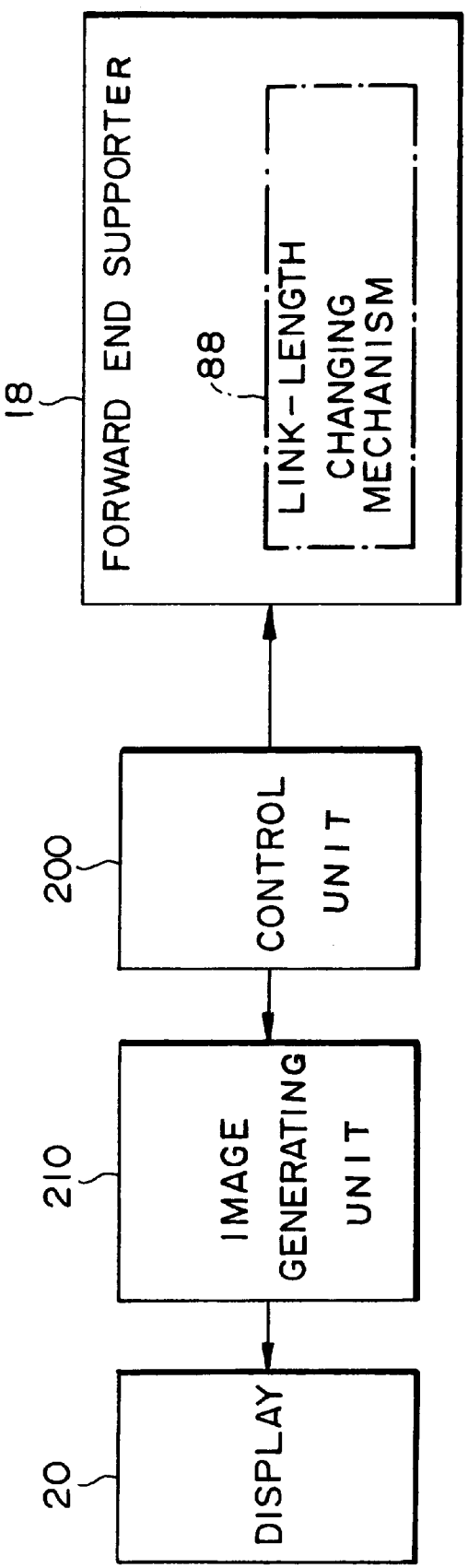
FIG. 23 is a block diagram schematically illustrating the function of the embodiment of FIG. 22.

The link-length changing mechanism 88 includes electrically powered cylinders 90 which are incorporated into the intermediate links 84 and 86. The link-length changing mechanism 88 is controlled by the control unit 200, as shown in the functional block diagram of FIG. 23.

When the lengths of the intermediate links 84 and 86 are changed by the electrically powered cylinders 90 in the link-length changing mechanism 88, the ratio of link in the four-link mechanism can be changed.

If the height of the top-side link 54 is increased as shown by the upper two-dot chain line, the inclination in the top-side link 54 may be decreased to realize a running state for acceleration. On the contrary, if the height of the top-side link 54 is decreased as shown by the lower two-dot chain line, the inclination in the top-side link 54 may be increased to realize a sharply cornering state for deceleration.

The other arrangements and functions will not further be described herein since they are similar to those of the previously mentioned embodiments.

The present invention is not limited to the illustrated and described embodiments, but may be carried out in any of various other forms within the scope of the invention.

Although the previously described embodiments have been described as to the four-link mechanism in which the distance between the top ends of the intermediate link pair is smaller than that between the bottom ends of the same, the present invention is not limited to such an arrangement. For example, the distance between the top ends may be selected to be larger than that between the bottom ends. Alternatively, these distances may be equal to each other.

Although the previously described embodiments have been described as to the distance control mechanism for the pairing elements designed to change the distance between the bottom ends of the intermediate link pair, the present invention may utilize a distance control mechanism for the pairing elements for changing the distance between the top ends of the intermediate link pair.

Although the previously described embodiments have been described as to the rear end supporter that uses the bearing and the spherical bearing on the riding portion and base, these bearings may inversely be mounted on the base and riding portion, respectively. Furthermore, the spherical bearings may be replaced by such bearings as only allows the horizontal rotation.

Although the embodiment of FIGS. 6–12 have been described as to the link-arm type distance control mechanism for the pairing elements, the present invention may similarly be applied to such an arrangement that a pair of cylinders are respectively mounted on left- and right-side links and that the ends of a pair of intermediate links are laterally movable along slide rails.

Although the present invention has been described as to the motorcycle simulator, it may similarly be applied to any other simulator such as bicycle, water-bike or jet-ski.

What is claimed is:

1. A simulator, comprising:
   a base;
   a riding portion located above said base;
   a rear end supporter located on said base for supporting the rear end of said riding portion at a rocking point; and
   a forward end supporter located on said base for supporting the front end of said riding portion for lateral rocking motion from a neutral position about the rocking point of said rear end supporter wherein the radius of pivoting in the lateral rocking motion for the riding portion is reduced to the rear end supporter, so as to improve the simulation of the simulator.

2. The simulator as defined in claim 1, wherein said forward end supporter supports said riding portion in such a manner that said riding portion is tilted in a direction opposite to the direction of movement of the front end of said riding portion on rocking.

3. The simulator as defined in claim 2, wherein said forward end supporter is formed of a four-link mechanism comprising: a pair of intermediate links connected at their lower ends to said base through two pairing elements; and a top-side link connected to the top ends of the respective intermediate links through two other pairing elements, the front end of said riding portion being connected to said top-side link.

4. The simulator as defined in claim 3, wherein the distance between the two other pairing elements connecting the pair of intermediate links to said top-side link is smaller than the distance between the two pairing elements connecting the pair of intermediate links to said base.

5. The simulator as defined in claim 4, wherein said two other pairing elements for connecting said pair of intermediate links to said top-side link in said forward end supporter are each formed of a ball-and-socket joint.

6. The simulator as defined in claim 4, wherein said top-side link includes a steering portion.

7. The simulator as defined in claim 6, wherein said steering portion includes at least one handlebar fixedly mounted on said top-side link.

8. The simulator as defined in claim 5, wherein said riding portion is connected to said rear end supporter through a ball-and-socket joint structure.

9. The simulator as defined in claim 8, wherein the rear end supporter allows any fore and aft shift in the rocking point supporting said riding portion on rocking.

10. The simulator as defined in claim 9, wherein the rear end supporter includes a movable support pivotally mounted at one end to said base about a shaft arranged substantially parallel to a plane including the rockable forward end supporter as well as the direction of rocking of said riding portion, the other end of said movable support being connected to said riding portion.

11. The simulator as defined in claim 9, further comprising a display means that represents a simulated image for a game and is located in front of said riding portion.

12. The simulator as defined in claim 11,
wherein said riding portion is modeled on the shape of a motorcycle; and
wherein said display means represents a simulated image of a motorcycle game for a player riding on said riding portion.

13. The simulator as defined in claim 12, wherein said riding portion has a seat section on the rear part of said riding portion, and steps on the sides of said riding portion below said seat section.

14. The simulator as defined in claim 4, further comprising:
two stopper plates each fixedly mounted on the respective one of said pair of intermediate links at its lower end, these stopper plates rocking together with said pair of intermediate links on rocking of said forward end supporter;
first stopper receiving members each interposed between each of said stopper plates and said base in the inside region between said intermediate links, each of said first stopper receiving members limiting the angle of rocking toward the inside region between said pair of intermediate links; and
second stopper receiving members each interposed between the respective one of said stopper plates and the base in the outside regions of said pair of intermediate links, each of said second stopper receiving members limiting the angle of rocking toward the outside region of each of said intermediate links.

15. The simulator as defined in claim 14, wherein said stopper plates, first stopper receiving members and second stopper receiving members stop one of said pair of intermediate links substantially at a vertical position on the maximum rocking amount of said riding portion.

16. The simulator as defined in claim 15, further comprising a returning means for returning said riding portion from a rocked position to a neutral position.

17. The simulator as defined in claim 16,
wherein said two pairing elements for connecting said pair of intermediate links to said base include rotatable shafts that intersect a plane containing said pair of intermediate links, respectively; and
wherein at least one of said rotatable shafts is provided with said returning means.

18. The simulator as defined in claim 16, wherein said forward end supporter includes a locking means for maintaining said riding portion at a neutral position.

19. The simulator as defined in claim 3, wherein said riding portion is connected to said rear end supporter through a ball-and-socket joint structure.

20. The simulator as defined in claim 19, wherein the rear end supporter allows any fore and aft shift in the rocking point supporting said riding portion on rocking.

21. The simulator as defined in claim 20, wherein the rear end supporter includes a movable support pivotally mounted at one end to said base about a shaft arranged substantially parallel to a plane including the rockable forward end supporter as well as the direction of rocking of said riding portion, the other end of said movable support being connected to said riding portion.

22. The simulator as defined in claim 20,
wherein said riding portion comprises a front riding section connected to said top-side link and a rear riding section connected to said rear end supporter; and
wherein said front and rear riding sections are rotatably connected to each other through a shaft substantially parallel to the rocking direction of the front end of said riding portion.

23. The simulator as defined in claim 3, further comprising:
two stopper plates each fixedly mounted on the respective one of said pair of intermediate links at its lower end, these stopper plates rocking together with said pair of intermediate links on rocking of said forward end supporter;
first stopper receiving members each interposed between each of said stopper plates and said base in the inside region between said intermediate links, each of said first stopper receiving members limiting the angle of rocking toward the inside region between said pair of intermediate links; and
second stopper receiving members each interposed between the respective one of said stopper plates and the base in the outside regions of said pair of intermediate links, each of said second stopper receiving members limiting the angle of rocking toward the outside region of each of said intermediate links.

24. The simulator as defined in claim 3, wherein said forward end supporter includes a distance control mechanism for pairing elements for controlling the distance between said two pairing elements on the lower ends of said pair of intermediate links.

25. The simulator as defined in claim 24, wherein said distance control mechanism for pairing elements comprises a slide rail for supporting said two pairing elements on the lower ends of said pair of intermediate links for lateral sliding movement, and a drive device for moving said two pairing elements on the lower ends of said pair of intermediate links along said slide rail.

26. The simulator as defined in claim 3, wherein said forward end supporter includes a link-length changing mechanism for changing the length of each of said pair of intermediate links.

27. The simulator as defined in claim 2, wherein said riding portion is connected to said rear end supporter through a ball-and-socket joint structure.

28. The simulator as defined in claim 27, wherein the rear end supporter allows any fore and aft shift in the rocking point supporting said riding portion on rocking.

29. The simulator as defined in claim 28, wherein the rear end supporter includes a movable support pivotally mounted at one end to said base about a shaft arranged substantially parallel to a plane including the rockable forward end supporter as well as the direction of rocking of said riding portion, the other end of said movable support being connected to said riding portion.

30. The simulator as defined in claim 1, wherein said riding portion is connected to said rear end supporter through a ball-and-socket joint structure.

31. The simulator as defined in claim 30, wherein the rear end supporter allows any fore and aft shift in the rocking point supporting said riding portion on rocking.

32. The simulator as defined in claim 31, wherein the rear end supporter includes a movable support pivotally mounted at one end to said base about a shaft arranged substantially parallel to a plane including the rockable forward end supporter as well as the direction of rocking of said riding portion, the other end of said movable support being connected to said riding portion.

33. The simulator as defined in claim 1, further comprising a returning means for returning said riding portion from a rocked position to a neutral position.

34. The simulator as defined in claim 1, wherein said forward end supporter includes a locking means for maintaining said riding portion at a neutral position.

35. The simulator as defined in claim 1, further comprising a display means that represents a simulated image for a game and is located in front of said riding portion.

36. A simulator, comprising:
   a base;
   a riding portion on said base;
   at least one handlebar located on the front side of said riding portion; and
   a display portion located in such a manner that said handlebar is positioned between said display portion and said riding portion;
   wherein the front side of said riding portion and handlebar are laterally rockable about the rear part of said riding portion and relative to a line connecting the rear part with said display portion; and
   wherein said riding portion and handlebar are tiltable toward said line connecting the rear part with said display portion on laterally rocking wherein the radius of pivoting in the lateral rocking motion for the riding portion and handlebar is reduced to the rear part of the riding portion, so as to improve the simulation of the simulator.

* * * * *